US011780003B2

(12) United States Patent
Wright et al.

(10) Patent No.: US 11,780,003 B2
(45) **Date of Patent: *Oct. 10, 2023**

(54) TITANIUM ALLOYS

(71) Applicant: QuesTek Innovations LLC, Evanston, IL (US)

(72) Inventors: James A. Wright, Los Gatos, CA (US); Jason Sebastian, Chicago, IL (US); Herng-Jeng Jou, San Jose, CA (US); Thomas S. Kozmel, II, Des Plaines, IL (US); Clay A. Houser, Chicago, IL (US)

(73) Assignee: QuesTek Innovations LLC, Evanston, IL (US)

( * ) Notice: Subject to any disclaimer, the term of this patent is extended or adjusted under 35 U.S.C. 154(b) by 958 days.

This patent is subject to a terminal disclaimer.

(21) Appl. No.: 16/681,112

(22) Filed: Nov. 12, 2019

(65) Prior Publication Data

US 2020/0078860 A1 Mar. 12, 2020

Related U.S. Application Data

(60) Continuation-in-part of application No. 13/780,831, filed on Feb. 28, 2013, now Pat. No. 10,471,503, (Continued)

(51) Int. Cl.

*C22C 14/00* (2006.01)
*B22D 25/00* (2006.01)

(Continued)

(52) U.S. Cl.

CPC ................ *B22D 25/00* (2013.01); *C22C 1/02* (2013.01); *C22C 14/00* (2013.01); *C22F 1/183* (2013.01)

(58) Field of Classification Search

CPC ........................................................ C22C 14/00

See application file for complete search history.

(56) References Cited

U.S. PATENT DOCUMENTS

| | | |
|---|---|---|
| 2,868,640 A | 1/1959 | Butler |
| 2,893,864 A | 7/1959 | Harris et al. |

(Continued)

FOREIGN PATENT DOCUMENTS

| | | |
|---|---|---|
| CA | 2797391 C | 8/2018 |
| EP | 1302554 A1 | 4/2003 |

(Continued)

OTHER PUBLICATIONS

Apr. 4, 2014—(EP) Office Action—App 11791654.4.

(Continued)

*Primary Examiner* — Matthew E. Hoban

(74) *Attorney, Agent, or Firm* — Banner & Witcoff, Ltd.

(57) ABSTRACT

Provided herein are titanium alloys that can achieve a combination of high strength and high toughness or elongation, and a method to produce the alloys. By tolerating iron, oxygen, and other incidental elements and impurities, the alloys enable the use of lower quality scrap as raw materials. The alloys are castable and can form α-phase laths in a basketweave morphology by a commercially feasible heat treatment that does not require hot-working or rapid cooling rates. The alloys comprise, by weight, about 3.0% to about 6.0% aluminum, 0% to about 1.5% tin, about 2.0% to about 4.0% vanadium, about 0.5% to about 4.5% molybdenum, about 1.0% to about 2.5% chromium, about 0.20% to about 0.55% iron, 0% to about 0.35% oxygen, 0% to about 0.007% boron, and 0% to about 0.60% other incidental elements and impurities, the balance of weight percent comprising titanium. There exists an unmet need to produce titanium alloys for use in aerospace applications which have a refined equiaxed grain structure. This can be beneficial for (Continued)

fatigue critical applications. The technology developed by QuesTek describes a titanium alloy and manufacturing methods thereof to obtain equiaxed grains on the order of 300 microns and corresponding UTS of approximately 170 ksi. In addition, various forms of the alloys are disclosed including ingots, billets, powders and wire in accord with the described microstructure and physical characteristics.

11 Claims, 18 Drawing Sheets

Related U.S. Application Data which is a division of application No. 13/098,038, filed on Apr. 29, 2011, now abandoned.

(60) Provisional application No. 61/330,081, filed on Apr. 30, 2010.

(51) Int. Cl.
*C22C 1/02* (2006.01)
*C22F 1/18* (2006.01)

(56) References Cited

U.S. PATENT DOCUMENTS 4,067,734 A 1/1978 Curtis et al.
4,606,886 A 8/1986 Neal
4,734,371 A 3/1988 Schmolke et al.
4,738,822 A 4/1988 Bania
4,889,170 A 12/1989 Mae et al.
4,913,720 A 4/1990 Gardon et al.
4,944,914 A 7/1990 Ogawa et al.
4,975,125 A 12/1990 Chakrabarti et al.
5,124,121 A 6/1992 Ogawa et al.
5,160,554 A 11/1992 Bania et al.
5,219,521 A 6/1993 Adams et al.
5,256,369 A 10/1993 Ogawa et al.
5,342,458 A 8/1994 Adams et al.
5,358,686 A 10/1994 Parris et al.
5,362,441 A 11/1994 Ogawa et al.
5,509,979 A 4/1996 Kimura
5,658,403 A 8/1997 Kimura
5,922,274 A 7/1999 Suzuki et al.
5,980,655 A 11/1999 Kosaka
6,053,993 A 4/2000 Reichman et al.
6,228,189 B1 5/2001 Oyama et al.
6,258,182 B1 7/2001 Schetky et al.
6,484,071 B1 11/2002 Conner et al.
6,632,396 B1 10/2003 Tetjukhin et al.
6,786,985 B2 9/2004 Kosaka et al.
6,800,243 B2 10/2004 Tetyukhin et al.
6,849,231 B2 2/2005 Kojima et al.
7,008,489 B2 3/2006 Bania
7,332,043 B2 2/2008 Tetyukhin et al.
7,837,812 B2 11/2010 Marquardt et al.
10,471,503 B2 * 11/2019 Wright .................... C22F 1/183
2002/0119068 A1 8/2002 Abkowitz et al.
2003/0086772 A1 * 5/2003 Giannakakos ........ F16B 33/008 411/432
2004/0099350 A1 5/2004 Mantione et al.
2005/0016706 A1 1/2005 Ray et al.
2019/0001437 A1 1/2019 Mathisen et al.

FOREIGN PATENT DOCUMENTS

EP 2563942 B1 10/2015
EP 3034637 A1 6/2016
GB 2563333 A 12/2018
JP 2001152268 A 6/2001
JP 2005076098 A 3/2005
JP 5992398 B2 9/2016
WO 2005123976 A2 12/2005
WO WO2005123976 * 12/2005

OTHER PUBLICATIONS

Sep. 6, 2013—(EP) Communication Pursuant to Article 94(3)—App 11791654.4.
T.E. Quested, A.T. Dinsdale & A.L. Greer, Thermodynamic Modeling of Growth-Restriction Effects in Aluminum Alloys, 53 Acta Materialia 1323 (2005).
Feb. 10, 2012—(PCT) International Search Report and Written Opinion—App PCT/US2001/034608.
J.E. Morral & G.R. Purdy, Particle Coarsening in Binary and Multicomponent Alloys, 30 Scripta Metallurgica et Materialia 905, vol. 30, No. 7, (1994).
H.J. Jou, P. Voorhees & G.B. Olson, Computer Simulations for the Prediction of Microstructure/Property Variation in Aeroturbine Disks, in Superalloys 2004, 877 (K.A. Green, T.M. Pollock, H. Harada, T.E. Howson, R.C. Reed, J.J. Schirra & S. Walston eds., 2006).
L. Nastac, M.N. Gungor, I. Ucok, K.L. Klug & and W.T. Tack, Advances in Investment Casting of Ti—6Al—4V Alloy: A Review, 19 International Journal of Cast Metals Research 73 (2006).
S. Bein & J. Béchet, Phase Transformation Kinetics and Mechanisms in Titanium Alloys Ti-6.2.4.6,b-CEZ and Ti-10.2.3, Journal de Physique IV, Colloque C1, supplement au Journal de Physique III, vol. 6, (1996).
C. Angelier, S. Bein & J. Béchet, Building a Continuous Cooling Transformation Diagram of b-CEZ Alloy by Metallography and Electrical Resistivity Measurements, Metallurgical and Materials Transactions A, vol. 28A, Dec. 1997—2467.
Johnson, A.J. Wagoner, Bull, C.W., Kumar, K.S. and Briant, C.L., The Influence of Microstructure and Strain Rate on the Compressive Deformation Behavior of Ti-6A1-4V, Metallurgical and Material Transaction A, 34A, Feb. 2003, 295-306.
Apr. 27, 2012—(US) Non-Final Office Action—U.S. Appl. No. 13/098,038.
Sep. 5, 2012—(US) Final Office Action—U.S. Appl. No. 13/098,038.
Nov. 10, 2014—(EP) Office Action—App 11791654.4.
May 11, 2015—(JP) Office Action—App. 2013-508287.
Mar. 8, 2016—(JP) Office Action—Appl 2013508287—Eng Tran.
Semiatin et al. "Coarsening Behavior of an Alpha-Beta Titanium Alloy", Metallurgical and Materials Transactions A, 35A, 2004, 2809-2819.
Aug. 21, 2017—(EP) Examination Report—App 15188525.8.
Jan. 10, 2018—(EP) Examination Report—App 15 188 525.8.
Dec. 27, 2018 (IN) Examination Report—App No. 9987/CHENP./2012.
Kumar, Kurnala Naresh et al., "Effect of Grain Boundary Alpha on Mechanical Properties of Ti5.4Al3Mo1V Alloy", JOM, vol. 67, No. 6, 2015.
Foltz, John W. et al., "Formation of Grain Boundary a in b Ti Alloys: Its Role in Deformation and Fracture Behavior of These Alloys", Metallurgical and Materials Transactions A, vol. 42A, Mar. 2011.
Neelakantan, Suresh, et al., "Prediction of the Martensite Start Temperature for b Titanium Alloys as a Function of Composition", Scripta Materialia 60 (2009) 611-614.
Mar. 31, 2021—(EP) European Search Report—App 20207260.9.

* cited by examiner

TITANIUM ALLOYS

CROSS-REFERENCE TO RELATED APPLICATIONS

This application is a continuation-in-part application of patent application Ser. No. 13/780,831 filed Feb. 28, 2013 entitled Titanium Alloys, issued Nov. 12, 2019, U.S. Pat. No. 10,471,503, which is a division of patent application Ser. No. 13/098,038 filed Apr. 29, 2011 entitled Titanium Alloys, which claims the benefit of priority to U.S. Provisional Patent Application No. 61/330,081, filed Apr. 30, 2010, the content of which is incorporated herein by reference in its entirety.

FEDERALLY-SPONSORED RESEARCH AND DEVELOPMENT

Activities relating to the development of the subject matter of this invention were funded at least in part by U.S. Government, Army Contract Nos. W15QKN-09-C-0144 and W15QKN-09-C-0026. Thus the U.S. may have certain rights in the invention.

BACKGROUND

Titanium alloys can provide low-weight corrosion-resistant structures and therefore have been used in a variety of applications. For example, Ti-6Al-4V, in weight percent, is a commercial alloy widely used for aerospace and medical applications. There are other applications which could also benefit from the use of titanium alloys, in various industry sectors such as defense, energy, chemical processing, marine, and transportation. However, the material and processing costs of the titanium can be prohibitive for such applications.

The material cost of titanium alloys is generally high at least in part because the content of minor elements such as iron and oxygen need to be tightly controlled in the melt stock. Elements such as iron and oxygen may segregate when the melt solidifies, leading to non-uniform mechanical properties. To eliminate this effect, extra-low interstitial (ELI) grade alloys have been developed. For example, the aerospace material specification on ELI grade Ti-6Al-4V limits iron to 0.25 and oxygen to 0.13, in weight percent.

The processing cost of titanium is generally high at least in part because titanium alloys are typically wrought. Forming the titanium alloys to near-net shape by the working process can involve costly machining. Moreover, the working and machining can generate significant material waste.

SUMMARY OF THE INVENTION

In an aspect the disclosure relates to an alloy comprising, by weight, about 3.0% to about 6.0% aluminum, 0% to about 1.5% tin, about 2.0% to about 4.0% vanadium, about 0.5% to about 4.5% molybdenum, about 1.0% to about 2.5% chromium, about 0.20% to about 0.55% iron, 0% to about 0.35% oxygen, 0% to about 0.007% boron, and 0% to about 0.60% other incidental elements and impurities, the balance of weight percent comprising titanium.

In an aspect the disclosure relates to a method comprising: providing a material that is based on at least 50% of a titanium-based alloy that includes, by weight, about 6% aluminum and about 4% vanadium, the balance of weight percent comprising titanium, the material further including, by weight, 0% to about 0.35% oxygen, 0% to about 0.55% iron, and other incidental elements and impurities; melting the material to provide an alloy that includes, by weight, about 3.0% to about 6.0% aluminum, 0% to about 1.5% tin, about 2.0% to about 4.0% vanadium, about 0.5% to about 4.5% molybdenum, about 1.0% to about 2.5% chromium, about 0.20% to about 0.55% iron, 0% to about 0.35% oxygen, 0% to about 0.007% boron, and 0% to about 0.60% other incidental elements and impurities, the balance of weight percent comprising titanium; and cooling the alloy with a gas pressurized to about 2 atm.

In a further aspect the disclosure relates to a method of processing the alloys as a near-net shape or investment casting that enables avoidance of the need for hot working to achieve a good combination of strength and ductility. In contrast, hot working is an essential aspect of many conventional titanium alloys like titanium-6 wt % aluminum-4 wt % vanadium which rely upon grain refinement due to forging and cooling from below the beta transus temperature. Control of content iron is an essential aspect of the disclosed aspect to minimize the as-cast grain size without hot-tearing that may result from excessing iron content. Furthermore, in the alloy and by the method of the invention, the alpha lath basketweave morphology of the intragrain microstructure is achieved upon cooling from above the beta transus temperature. The interlocking basketweave morphology is achieved as an aspect of the invention in contrast to parallel or lamellar alpha laths in Ti-6-4 alloys.

An additional aspect of the invention involves the ability to process the alloy in forms to enable use of the alloys in practice of additive manufacturing. The alloys are thus susceptible of forms such as wire and powders that are characterized by processing steps such as rolling, drawing and plasma atomization. Such processing is thus enabled without damaging the physical and structure of the alloy.

Other aspects and embodiments are encompassed within the scope of the disclosure and will become apparent in light of the following description and accompanying Drawings.

DETAILED DESCRIPTION

Figure 1:
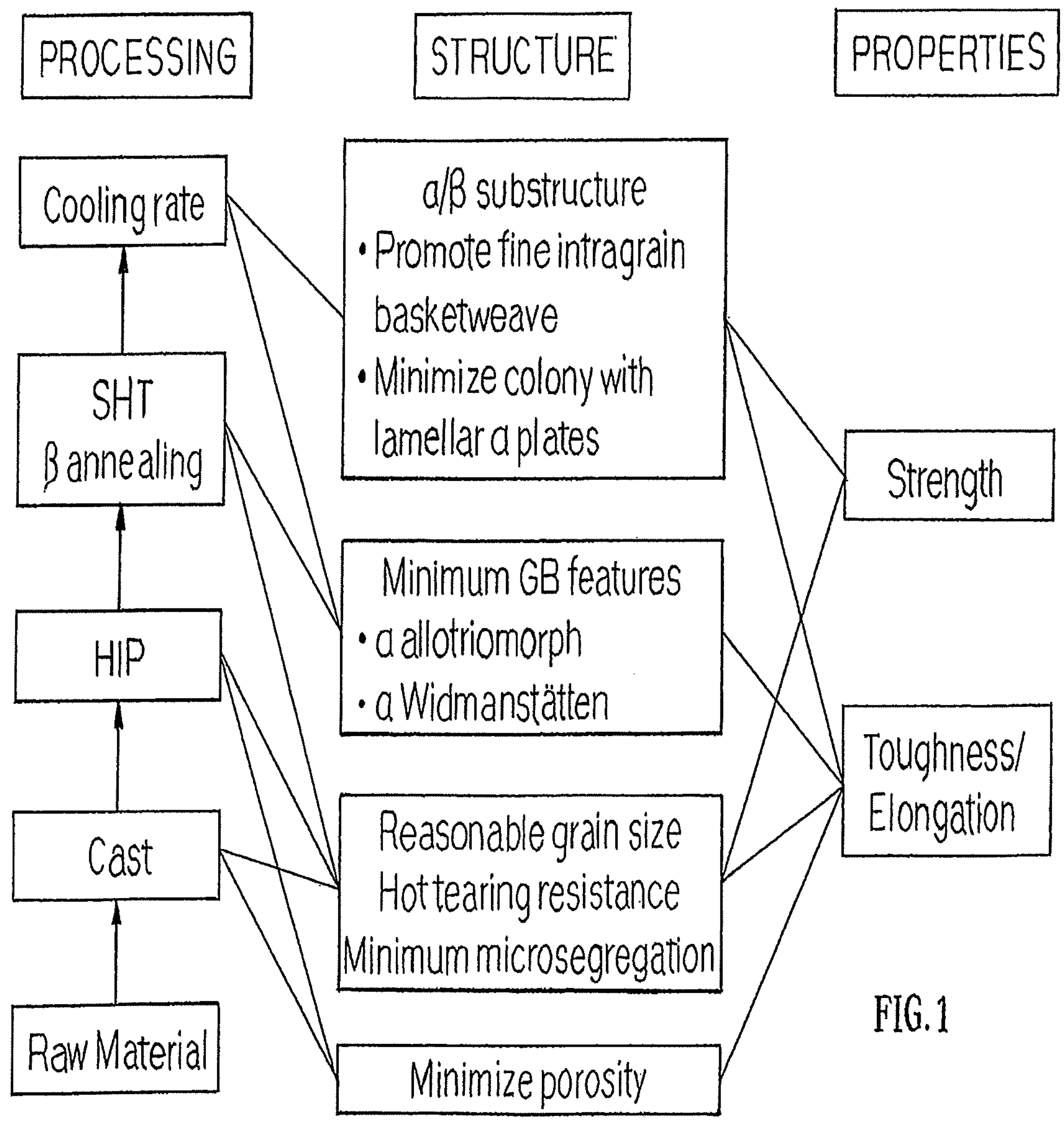
FIG. 1 is a systems-design chart illustrating processing-structure-property relationships of non-limiting embodiments of alloys falling within the scope of the disclosure.

It should be understood that the claims are not limited in application to the details of construction and the arrangements of the components set forth in the following description or illustrated in the drawings that depict non-limiting embodiments of the disclosure. Other aspects and embodiments will be apparent in light of the following detailed description.

Any recited range described herein is to be understood to encompass and include all values within that range, without the necessity for an explicit recitation.

In a general sense, the inventors have unexpectedly found titanium alloys that can achieve a combination of high strength and high toughness at a low cost by selecting compositions with a suitable processing, cost, and microstructure. The disclosed alloys comprise α-phase laths in a basketweave morphology. The α-phase laths in the basketweave morphology can achieve a combination of high strength and high toughness. The cost of the disclosed alloys can be low because low-cost raw materials can be used in near-net-shape castings, followed by a cooling at a cooling rate that is robust and industrially feasible.

One source of low-cost raw material is scrap titanium alloys. A titanium alloy known as Ti 6-4 is one of the most widely available alloy for remelting. Ti 6-4 includes, by weight, about 6% aluminum and about 4% vanadium, the balance of weight percent comprising titanium. The raw material input for the disclosed alloys can be at least 50%, or at least 70% Ti 6-4. The cost of the disclosed alloys can be low also because the alloys can tolerate by weight, 0% to about 0.35% oxygen, 0% to about 0.55% iron, and other incidental elements and impurities. Iron is a common impurity element in titanium alloys that can result from contamination during sponge processing. By tolerating iron, oxygen, and other incidental elements and impurities, the disclosed alloys enable the use of lower quality scrap like revert and machining turnings as raw materials.

The manufacturing cost of the disclosed alloys can also be low because forging is not required and machining costs can be reduced. Forging and machining costs can constitute about half the cost of a titanium component depending on the component geometry. Therefore it can be advantageous to have an alloy suitable for near-net-shape casting while maintaining good mechanical properties. While some embodiments of the disclosed alloys are cast, others can be forged and machined. The processing cost of the disclosed alloys can also be low because the alloys can be cooled at a cooling rate that is robust and industrially feasible. As thicker sections of a casting cool slower than thinner sections, the microstructure can vary from section to section if the cooling rate is not very robust. The disclosed alloys can be processed in an inexpensive yet robust way.

In an aspect, the disclosure relates to an alloy comprising, by weight, about 3.0% to about 6.0% aluminum, 0% to about 1.5% tin, about 2.0% to about 4.0% vanadium, about 0.5% to about 4.5% molybdenum, about 1.0% to about 2.5% chromium, about 0.20% to about 0.55% iron, 0% to about 0.35% oxygen, 0% to about 0.007% boron, 0% to about 0.60% other incidental elements and impurities, and the balance of weight percent comprising titanium. It is noted that the embodiments described herein include a variation in each constituent of plus or minus ten percent of the recited value or values. It is also understood that the alloys described herein may consist only of the above-mentioned constituents or may consist essentially of such constituents, or in other embodiments, may include additional constituents.

In embodiments, the aluminum content can be about 4.0% to about 5.5%, the tin content can be 0% to about 1.0%, the vanadium content can be about 2.5% to about 3.5%, the molybdenum content can be about 1.0% to about 2.0%, the chromium content can be about 1.0% to about 2.0%, the iron content can be about 0.30% to about 0.55%, the oxygen content can be 0% to about 0.20%, the boron content can be 0% to about 0.005%, and the content of other incidental elements and impurities can be 0% to about 0.20%.

In embodiments, the alloy is cooled from a β-phase to an α-phase at a cooling rate so as to form α-phase laths in a basketweave morphology. At a high temperature, titanium alloys can form a β-phase with a body-centered cubic crystal structure. When cooled at a cooling rate higher than about 10° C. per second, the β-phase in certain titanium alloys can transform to a martensitic α" phase, resulting in strengthening but also reduced ductility. When cooled at a cooling rate between about 0.03° C. per second to about 10° C. per second, however, the β-phase in certain titanium alloys can transform to a microstructure comprising α-phase with a hexagonal close-packed crystal structure that forms laths in a basketweave morphology. The basketweave microstructure is produced due to an enhanced homogeneous nucleation of intragrain a variants that grow into the β grain in up to twelve crystallographic orientations. In contrast, when Ti 6-4 is cooled from a β-phase to an α-phase at an industrially relevant cooling rate up to about 10° C. per second, it often displays a microstructure with colonies of coarse, highly parallel a lamellae. In general, components produced through casting processes are not subsequently forged or annealed in a two-phase field of α- and β-phases for recrystallization, and as a result, components made of titanium alloys with a coarse lamellar microstructure do not show the best combination of strength and ductility. The substantially finer α-phase laths in a basketweave morphology as in the disclosed alloys, however, can achieve a combination of high strength and high toughness. Thus, the basketweave morphology typically constitutes about three quarters or more of the disclosed alloy microstructure.

In embodiments, the laths measure no more than about 100 microns, no more than about 80 microns, no more than about 25 microns, or no more than about 6 microns in the longest dimension.

In embodiments, the alloy has a tensile elongation of at least about 10% and has a tensile strength greater than about 960 MPa wherein the alloy is cast, subjected to a hot isostatic pressing (HIP) at 900° C. and about 100 MPa Ar for 2 hours, and annealed. In other embodiments, the alloy has a tensile elongation of at least about 4% and has a tensile strength greater than about 1170 MPa wherein the alloy is cast, subjected to a hot isostatic pressing at 900° C. and about 100 MPa Ar for 2 hours, and annealed.

In one aspect, alloys according to embodiments described herein are castable using low-cost raw materials, and can form the basketweave microstructure by a commercially feasible heat treatment that does not require hot-working or rapid cooling rates. In contrast, Table 1 shows compositions of several titanium alloys that either exhibit poor castability or utilize high-cost raw materials. Some titanium alloys that can achieve a basketweave microstructure can have a generally poor castability because its fluidity is lower than that of Ti 6-4. These titanium alloys can include alloying elements known as 0 stabilizers, such as iron. Although (i stabilizers can help achieve the basketweave microstructure, they can also render the casting susceptible to hot-tearing defects during solidification. Hot tearing is caused by a significant volumetric difference between the liquid and the solid. Other 3 stabilizers, such as vanadium, niobium, and molybdenum, can be expensive as raw material. For example, alloys such as Beta-CEZ and Ti-17 use costly zirconium. Of the alloys in Table 1, only SP-700 can utilize common Ti 6-4 as foundry scrap, because SP-700 has the same weight ratio of aluminum to vanadium as Ti 6-4. S.P-700, however, has 2% of iron by weight. This iron content can render the casting susceptible to hot tearing, and therefore SP-700 can be incompatible with casting. In contrast, the disclosed alloys are castable using low-cost raw materials, and can form the basketweave microstructure at commercially feasible cooling rates, achieving a better combination of strength and ductility than Ti 6-4.

TABLE 1

| | wt %, Ti balanced | | | | | | | | | |
|---|---|---|---|---|---|---|---|---|---|---|
| | Al | Sn | V | Mo | Cr | Fe | Zr | Y | B | O |
| Corona-5 | 4.5 | | | 5 | 1.5 | | | | | |
| Beta-CEZ | 5 | 2 | | 4 | 2 | 1 | 4 | | | |
| SP-700 | 4.5 | | 3 | 2 | | 2 | | | | |
| Ti-17 | 5 | 2 | | 4 | 4 | | 2 | | | |
| Ti-10-2-3 | 3 | | 10 | | | 2 | | | | |

Figure 2:
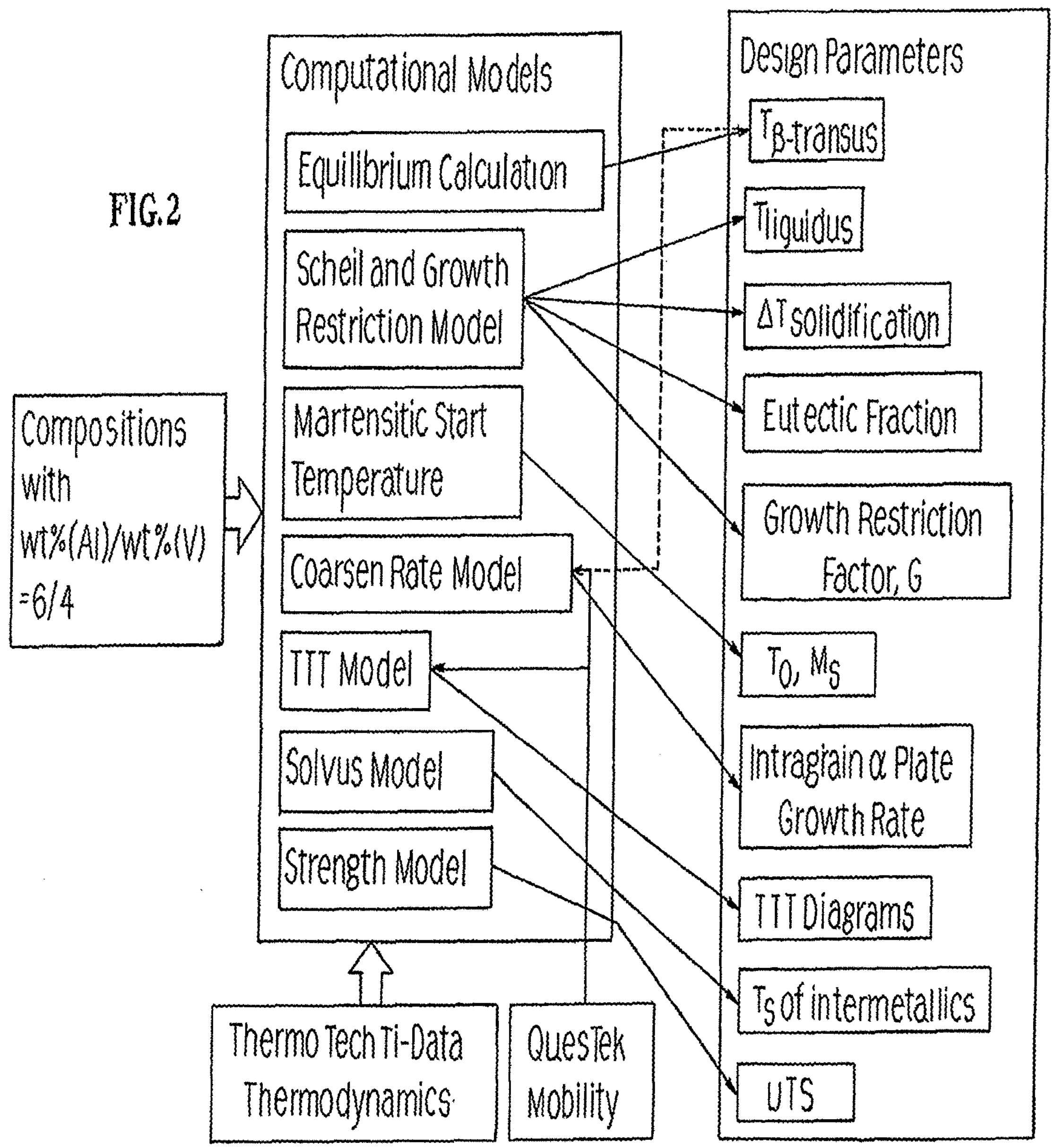
FIG. 2 is a chart setting forth a set of integrated computational models suitable for the design of alloys falling within the scope of the disclosure as described herein including, for example, FIG. 1.

Referring to the systems-design chart depicted in FIG. 1, by a suitable processing and structure, the alloys can achieve a combination of properties such as strength and toughness or elongation that is superior to Ti 6-4 casting. Based on this systems-design chart, a set of computational models are developed to enable the alloy composition selection, as shown in FIG. 2. To reduce the cost, the alloys have a weight ratio of aluminum to vanadium similar to Ti 6-4, so that they can be fabricated by remelting foundry scrap of Ti 6-4 as at least 50% of its starting raw material. Although small quantities of expensive elements such as niobium and zirconium can be present in the alloys from the scrap material, suitably they are substantially avoided as alloying additions.

To select compositions with a suitable microstructure, the β-transus temperature is determined through thermodynamic equilibrium calculations with thermodynamics calculation packages such as Thermo-Calc® software version N offered by Thermo-Calc Software. Thermo-Calc can be used with the Ti-Data version 3 thermodynamics database offered by Thermotech Ltd. and a mobility database that QuesTek Innovations LLC developed based on open-literature data.

To determine the freezing range and avoid hot tearing, Thermo-Calc's Scheil solidification calculation can be used. A growth-restriction model as disclosed in T. E. Quested, A. T. Dinsdale & A. L. Greer, *Thermodynamic Modeling of Growth-Restriction Effects in Aluminum Alloys,* 53 Acta Materialia 1323 (2005) (incorporated by reference herein) can be used to select compositions with a large growth-restriction parameter. The growth-restriction parameter is also interchangeably called the growth-restriction factor. Compositions with a large growth-restriction parameter reject solute atoms during solidifications and can result in a fine as-cast grain size. While an expanded solidification range could increase the growth-restriction parameter and in turn refine the grains, it could also cause hot tearing. Therefore, alloying elements such as iron are optimized to less than about 0.55% by weight to achieve a suitable balance of grain refinement and hot-tearing resistance.

A martensite start temperature model as disclosed in Suresh Neelakantana, *Prediction of the Martensite Start Temperature for* β *Titanium alloys as a Function of Composition,* 60 Scripta Materialia 611 (2009) (incorporated by reference herein) can be used to select alloy compositions. The martensite formed through a diffusionless transformation can have a low ductility. Thus, alloy compositions are selected to substantially avoid martensitic transformation at industrially relevant cooling rates.

A multicomponent coarsening-rate model as disclosed in J. E. Morral & G. R. Purdy, *Particle Coarsening in Binary and Multicomponent Alloys,* 30 Scripta Metallurgica et Materialia 905 (1994) (incorporated by reference herein) can be used to compute a coarsening-rate constant for the intragranular a laths at 260° C. below the β-transus temperature. This temperature approximates the nose temperature of the C-curve on a time-temperature transformation diagram. The coarsening-rate constant can be derived by thermodynamic parameters such as diffusion coefficients, second-order partial derivatives of the molar Gibbs free energy, and the partitioning ratio of solute atoms. These thermodynamic parameters in turn can be computed from thermodynamic database and calculation packages such as Thermo-Calc software version N and the kinetic software DICTRA™ (DIffusion Controlled TRAnsformations) version 24, both offered by Thermo-Calc Software. The coarsening-rate constant normalized by surface energy and molar volume is hereinafter called $K_\alpha$. Alloy compositions with a suitably low $K_\alpha$ are selected from alloys according to embodiments described herein. By restricting the growth rate of the α laths, more time can be available for nucleating fine α laths of multiple orientations, enabling a microstructure with higher strength and toughness. Molybdenum has a low diffusivity and therefore can be very effective at reducing the α-lath growth rate, but the addition of molybdenum can also be costly. Chromium tends to partition very little to the α laths compared to the β grain and therefore can also retard the α lath growth, at a lower cost compared to molybdenum. A combination of chromium and molybdenum can thus effectively lower $K_\alpha$ at a relatively low cost.

A time-temperature transformation model based on a multicomponent precipitation model as disclosed in H.-J. Jou, P. Voorhees & G. B. Olson, *Computer Simulations for the Prediction of Microstructure/Property Variation in Aeroturbine Disks*, in Superalloys 2004, 877 (K. A. Green, T. M. Pollock, H. Harada, T. E. Howson, R. C. Reed, J. J. Schirra & S. Walston eds., 2006) (incorporated by reference herein) can be used to predict the nucleation rate of intragranular a laths. A high nucleation rate of a laths in multiple orientations can help achieve an intragranular basketweave microstructure.

The solvus temperature of undesirable and stable intermetallic phases is suitably determined through thermodynamic equilibrium calculations with thermodynamic database and calculation packages such as Thermo-Calc® software version N offered by Thermo-Calc Software, the Ti-Data version 3 thermodynamics database offered by Thermotech Ltd., and a mobility database that QuesTek Innovations LLC developed based on open-literature data. Also, a solid-solution strength model based on experimental model alloy coupons or buttons is suitably used to guide the selections of compositions that achieve a high strength.

Figure 3:
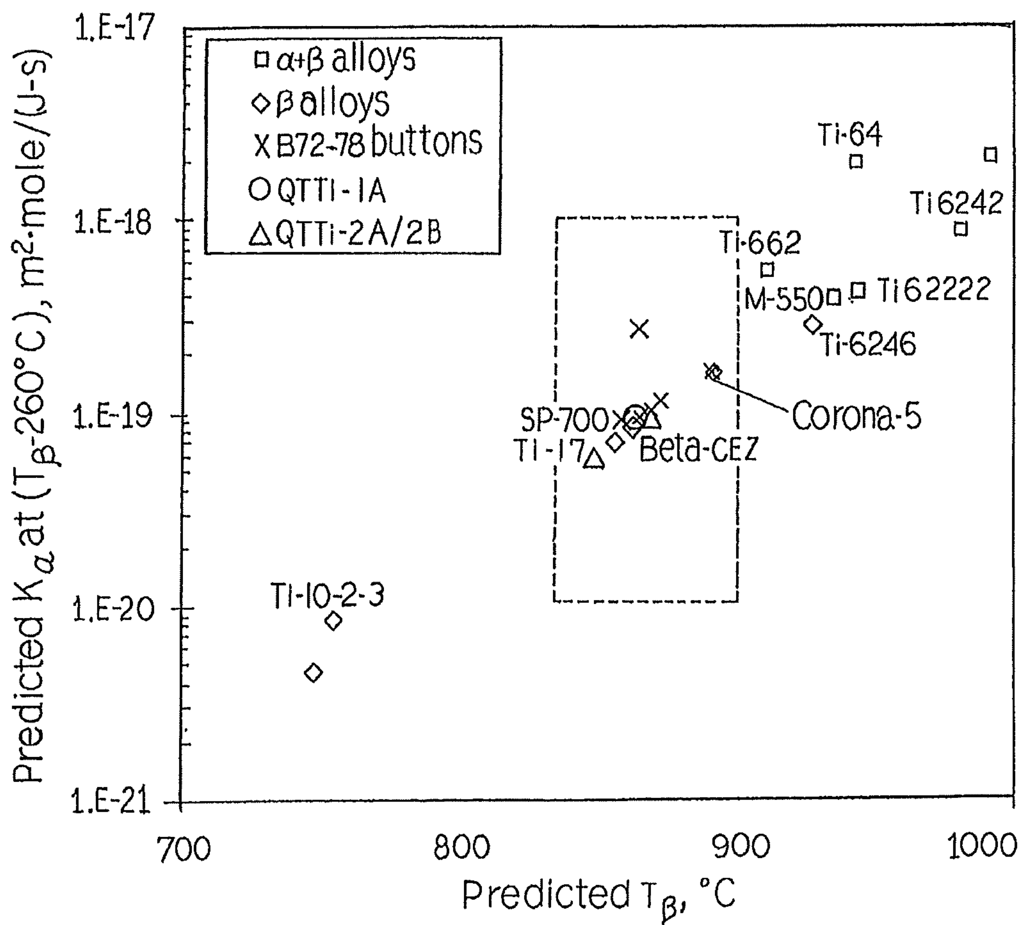
FIG. 3 is a graph plotting the coarsening-rate constant of the $\alpha$ phase against the $\beta$ transus temperature of non-limiting embodiments of alloys falling within the scope of the disclosure as described herein including, for example, FIG. 1.

Referring also to FIG. 3, $K_\alpha$ and the β-transus temperature are optimized for alloys according to embodiments described herein to achieve a basketweave microstructure at industrially feasible cooling rates. The horizontal axis in FIG. 3 is the β-transus temperature, which controls the temperature range and the cooling rate at which basketweave microstructures can occur. To achieve a suitable microstructure, the β transus temperature is selected to be below 900° C. Two-phase alloys of α- and β-phase, such as Ti 6-4, with β transus above about 900° C. form colonies of lamellar a plates instead of basketweave laths. The lamellar microstructure provides lower strength and toughness compared to the basketweave microstructure. Therefore, suitable alloy compositions can have a β transus below about 900° C.

Figure 4:
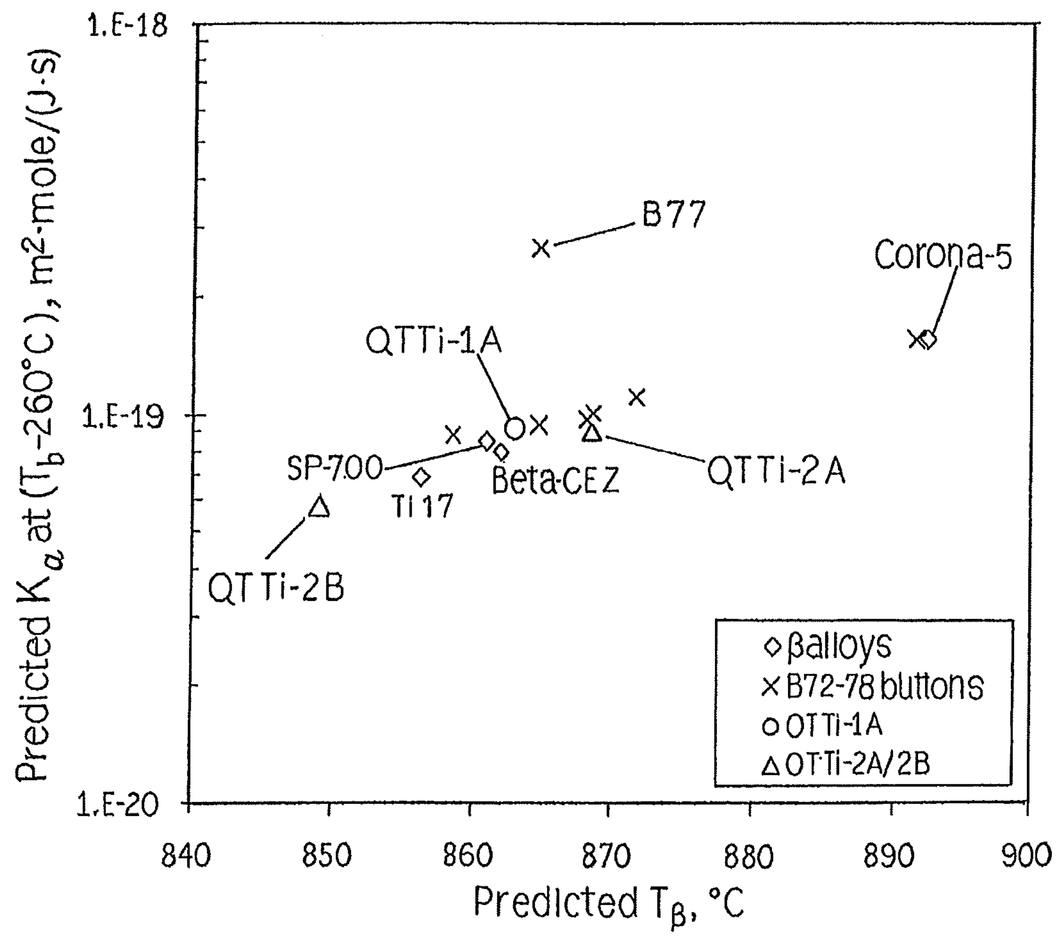
FIG. 4 is an enlarged graph similar to FIG. 3 plotting the coarsening-rate constant of the $\alpha$ phase against the $\beta$ transus temperature of non-limiting embodiments of alloys falling within the scope of the disclosure as described herein.
Figure 5:
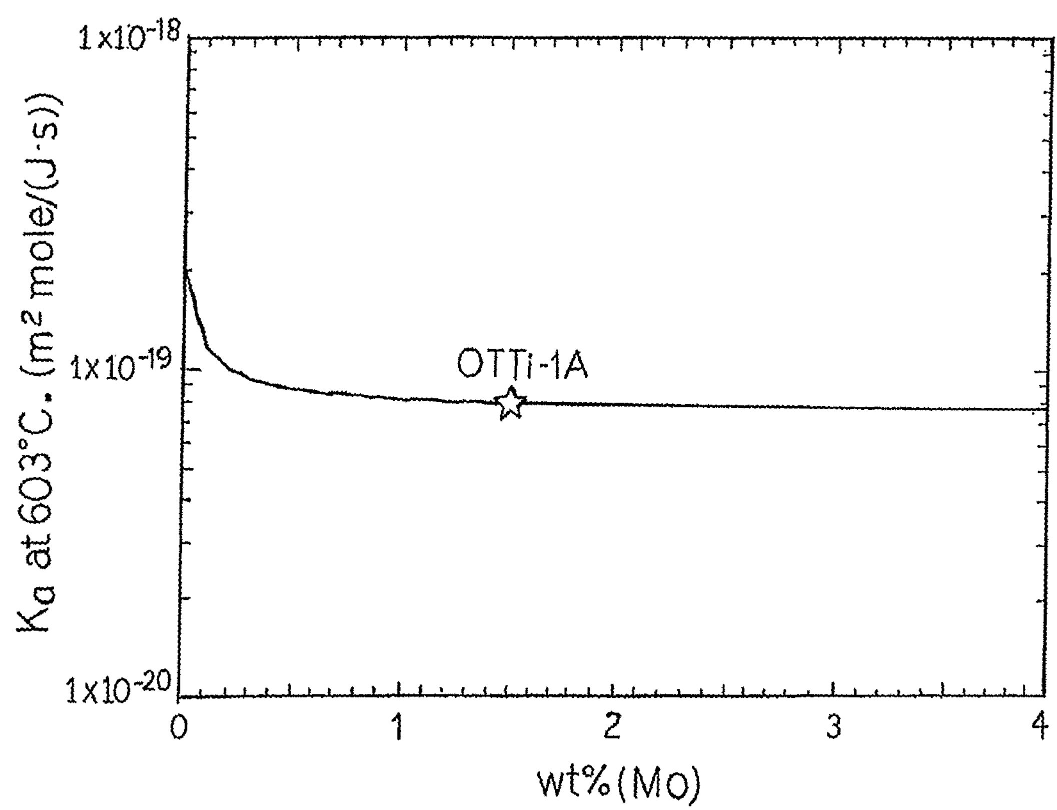
FIG. 5 is a graph plotting the coarsening-rate constant of the $\alpha$ phase against the content of molybdenum at 603° C. for a non-limiting embodiment of alloys falling within the scope of the disclosure as described herein including, for example, FIG. 1.

The vertical axis in FIG. 3 is the normalized coarsening-rate constant $K_\alpha$ at approximately the nose temperature of the C-curve on a time-temperature transformation diagram. Alloys according to embodiments described herein can limit $K_\alpha$ to limit the formation of detrimental a phase on grain boundaries and therefore have a built-in tolerance for a slow cooling rate after solution treatment. A limited $K_\alpha$ can also make more time available for nucleating fine α laths of multiple orientations. Therefore, the coarsening-rate constant of the α phase can be limited to below about $4\times10^{-19}$ $m^2\cdot mol/J\cdot s$, below about $2\times10^{-19}$ $m^2\cdot mol/J\cdot s$, or below about $1.5\times10^{-19}$ $m^2\cdot mol/J\cdot s$. As shown in FIGS. 3 and 4, $K_\alpha$ is largely proportionate to the β-transus temperature. Therefore, $K_\alpha$ can be reduced by limiting the β-transus temperature. The variation of $K_\alpha$ at a given β transus temperature, however, can still be significant. $K_\alpha$ can be further reduced by adding slow diffusers with a low solubility in the α phase, such as molybdenum and chromium. But the benefit of reduced $K_\alpha$ can diminish after adding about 0.5% by weight of molybdenum. For example, FIG. 5 shows $K_\alpha$ against the content of molybdenum at 603° C. for a non-limiting embodiment. The temperature 603° C. is about 260° C. below the β-transus temperature for this embodiment, approximating the nose temperature of the C-curve on a time-temperature transformation diagram. FIG. 5 shows that $K_\alpha$ strongly depends on the content of molybdenum up to about 0.5% by weight. After 0.5% by weight of molybdenum, however, additional molybdenum does not significantly reduce $K_\alpha$. For at least this reason, alloys according to embodiments described herein use molybdenum in combination with chromium.

Figure 6:
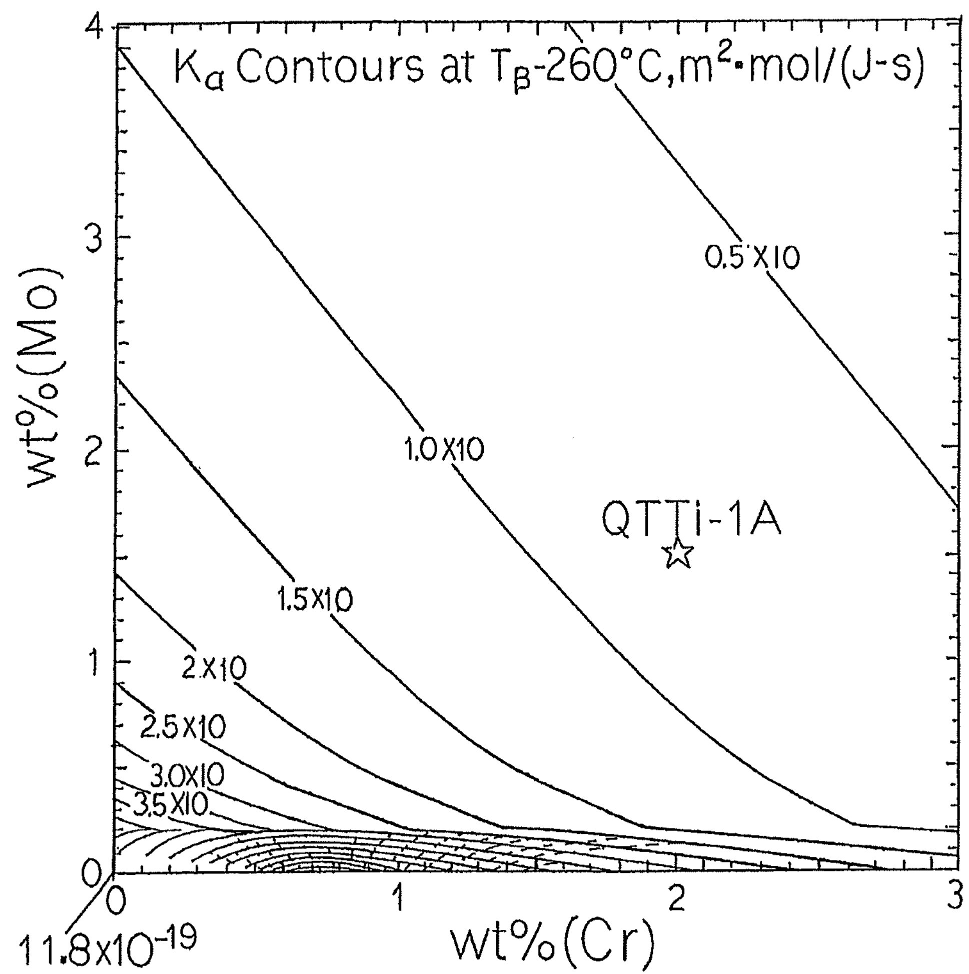
FIG. 6 is a graph plotting contours of the coarsening-rate constant of the $\alpha$ phase as a function of the contents of molybdenum and chromium at 603° C. for non-limiting embodiments of alloys falling within the scope of the disclosure as described herein including, for example, FIG. 1.

Referring also to FIG. 6, a combination of chromium and molybdenum can effectively lower $K_\alpha$. Compared to molybdenum, chromium tends to partition less to the α laths than to the β grain and therefore can also reduce the α lath growth rate. In addition, chromium has a lower density and lower cost compared to molybdenum. Therefore, alloys according to embodiments described herein use chromium in combination with molybdenum. An excessive amount of chromium, however, can promote the precipitation of an embrittling $Ti_2Cr$ Laves phase that is undesirable. The chromium content is thus optimized to achieve a suitable balance of $K_\alpha$ and Laves phase precipitation.

Figure 7:
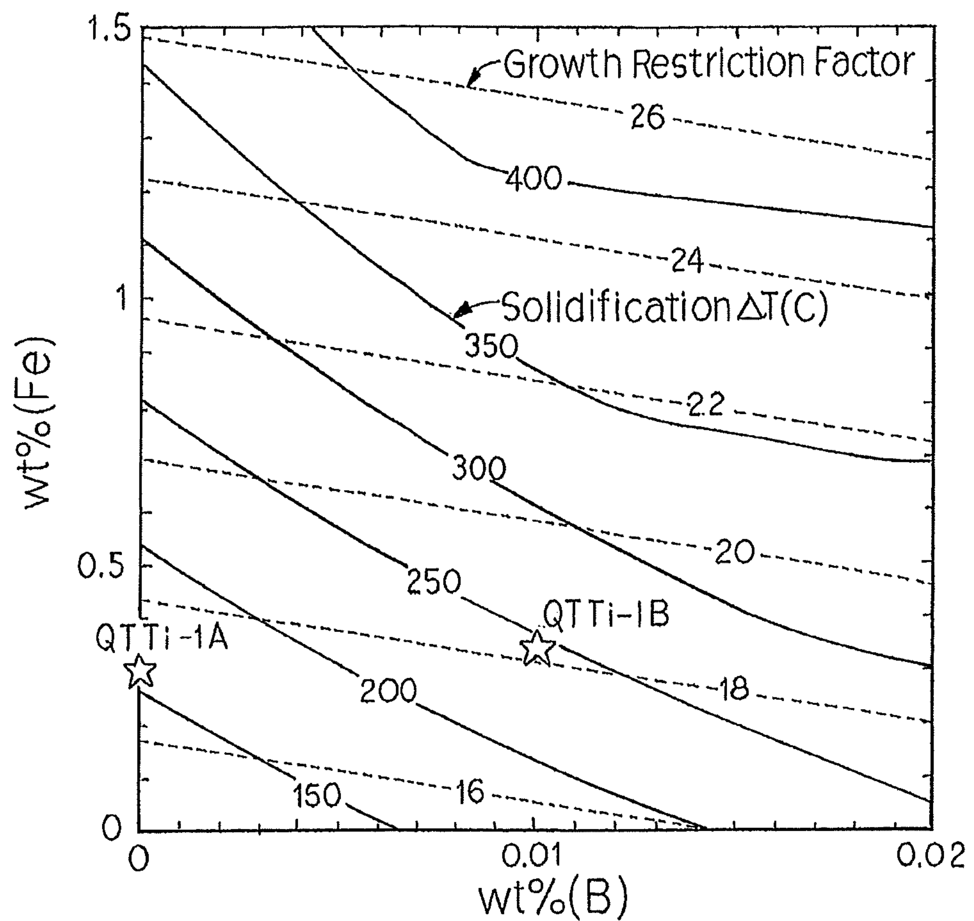
FIG. 7 is a graph plotting contours of the Scheil freezing range and the growth-restriction parameter as functions of the contents of iron and boron for non-limiting embodiments of alloys falling within the scope of the disclosure as described herein including, for example, FIG. 1.

Referring also to FIG. 7, alloys according to embodiments described herein are compatible with casting with no further hot-deformation, by reducing the growth-restriction parameter and the Scheil freezing range. The Scheil freezing range is also interchangeably called the solidification ΔT or the solidification range. FIG. 7 shows the calculated contours of the growth-restriction parameter and the Scheil freezing range as functions of the iron and boron contents in an alloy. The vertical axis is the iron content in an alloy according to embodiments described herein, and the horizontal axis is the boron content in an alloy according to embodiments described herein. The solid lines represent contours of the freezing range, as calculated with a Scheil approximation of the solidification. In some embodiments, a Scheil freezing range of less than about 200° C. can be helpful to avoid hot-tearing defects in cast components. In other embodiments, the cast alloy can be subsequently hot-worked to cure hot-tearing defects. The dashed lines represent contours of the growth-restriction parameter. Larger values of the growth-restriction parameter promote finer grains. A larger freezing range can generally increase the growth-restriction parameter and in turn refine the grains, but a larger freezing range can also render the casting susceptible to hot-tearing defects during solidification. Thus, alloying elements such as iron and boron are optimized in the alloys according to embodiments described herein to achieve a suitable balance of hot-tearing resistance and grain refinement. Specifically, iron can be limited to no more than about 0.55% by weight, and boron can be limited to no more than about 0.007% by weight (70 ppm by weight) to avoid hot-tearing defects and boride particles that can reduce toughness.

In an aspect, the disclosure relates to a method comprising: providing a material that is based on 25%, and preferably, at least 50% of a titanium-based alloy that includes, by weight, about 6% aluminum and about 4% vanadium, the balance of weight percent comprising titanium, the material further including, by weight, 0% to about 0.35% oxygen, 0% to about 0.55% iron, and other incidental elements and impurities; melting the material to provide an alloy that includes, by weight, about 3.0% to about 6.0% aluminum, 0% to about 1.5% tin, about 2.0% to about 4.0% vanadium, about 0.5% to about 4.5% molybdenum, about 1.0% to about 2.5% chromium, about 0.20% to about 0.55% iron, 0% to about 0.35% oxygen, 0% to about 0.007% boron, and 0% to about 0.60% other incidental elements and impurities, the balance of weight percent comprising titanium; and cooling the alloy with a gas pressurized to about 2 atm.

Additionally, counter-examples were also prepared and tested for contrast. The counter-examples are shown in Table 2 as B77, Ti-64, QTTi-1B, and QTTi-1C. The examples and counter-examples are described in greater detail below. All alloys prepared and tested maintain a 6-to-4 weight ratio of aluminum to vanadium to utilize common Ti 6-4 as foundry scrap and reduce the material cost. To further minimize the cost, all alloys substantially avoid the alloying elements niobium and zirconium except as incidental elements and impurities from the input scrap material up to about 0.6% by weight. Iron is kept to be less than about 0.55% by weight to help the hot-tearing resistance during casting. The alloys tolerate, by weight, about 0.15% to about 0.30% of oxygen.

TABLE 2

| | | wt %, Ti balanced | | | | | | | | | |
|---|---|---|---|---|---|---|---|---|---|---|---|
| | | Al | Sn | V | Mo | Cr | Fe | Zr | Y | B | O |
| Coupon Samples | B72 | 4.58 | 0.98 | 2.93 | 1.95 | 1.52 | 0.53 | | | | 0.18 |
| | B73 | 4.78 | 0.02 | 2.99 | 2.02 | 1.53 | 0.52 | | | | 0.197 |
| | B74 | 3.83 | 0.03 | 2.97 | 1.40 | 1.49 | 0.50 | | | | 0.16 |
| | B75 | 5.24 | 0.94 | 2.92 | 0.96 | 2.47 | 0.51 | | | | 0.17 |
| | B76 | 4.82 | 0.90 | 3.04 | 1.98 | 1.46 | 0.53 | | | | 0.165 |
| | B77 | 4.86 | 0 | 3.03 | 0.02 | 2.97 | 0.53 | | | | 0.15 |
| | B78 | 5.98 | 0.02 | 2.98 | 1.45 | 1.89 | 0.49 | | | | 0.17 |
| Casting | Ti-64 | 5.9 | — | 4.3 | — | — | 0.21 | | | | 0.15 |
| | QTTi-1A | 4.5 | 0.8 | 3.0 | 1.5 | 2.0 | 0.31 | | | | 0.25 |
| | QTTi-1B | 4.4 | 1.0 | 2.9 | 1.5 | 1.8 | 0.35 | | | 0.01 | 0.14 |
| | QTTi-1C | 4.5 | 0.7 | 3.2 | 1.5 | 1.7 | 0.33 | | 0.11 | | 0.15 |
| | QTTi-2A | 4.30 | | 2.82 | 1.49 | 1.63 | 0.40 | 0.13 | | | 0.15 |
| | QTTi-2B | 5.69 | | 3.62 | 4.00 | 1.90 | 0.38 | 0.51 | | | 0.15 |

In embodiments, the titanium-based melt can include, by weight, about 4.0% to about 5.5% aluminum, 0% to about 1.0% tin, about 2.5% to about 3.5% vanadium, about 1.0% to about 2.0% molybdenum, about 1.0% to about 2.0% chromium, about 0.30% to about 0.55% iron, 0% to about 0.2% oxygen, 0% to about 0.005% boron, and 0% to about 0.2% other incidental elements and impurities, the balance of weight percent comprising titanium.

In embodiments, the method further comprises: subjecting the alloy to a hot isostatic pressing at 900° C. and about 100 MPa Ar for 2 hours; annealing the alloy so as to form a single-phase microstructure of β-phase; and cooling the alloy from the β-phase to an α-phase at a cooling rate so as to form α-phase laths in a basketweave morphology. The annealing can be at a temperature range of about a β-transus temperature of the alloy to about 950° C. The cooling rate can be between about 0.03° C. per second to about 10° C. per second.

In one aspect, alloys according to embodiments described herein are selected to be feasibly fabricated by recycling or remelting foundry scrap of Ti 6-4 as more than 50% of the raw material input. The disclosed alloys are also compatible with typical cooling rates achieved by gas quenching in conventional vacuum furnaces (up to about 10° C. per second). Moreover, the alloys show a robust response to cooling rate variations. By reducing $K_{\alpha}$ and the β-transus temperature as previously described, the alloys are able to maintain the basketweave microstructure at slow cooling rates.

Some samples exemplary of embodiments of the alloy disclosed herein were prepared and tested for physical properties. The measured compositions of the alloy prototypes evaluated as part of this disclosure are shown in Table 2 as B72-B76, B78, QTTi-1A, QTTi-2A, and QTTi-2B.

In an aspect the disclosure provides an alloy produced by any of the methods described herein. The method can comprise: providing a material that is based on at least 50% of a titanium-based alloy that includes, by weight, about 6% aluminum and about 4% vanadium, the balance of weight percent comprising titanium, the material further including, by weight, 0% to about 0.35% oxygen, 0% to about 0.55% iron, and other incidental elements and impurities; melting the material to provide an alloy that includes, by weight, about 3.0% to about 6.0% aluminum, 0% to about 1.5% tin, about 2.0% to about 4.0% vanadium, about 0.5% to about 4.5% molybdenum, about 1.0% to about 2.5% chromium, about 0.20% to about 0.55% iron, 0% to about 0.35% oxygen, 0% to about 0.007% boron, and 0% to about 0.60% other incidental elements and impurities, the balance of weight percent comprising titanium; and cooling the alloy with a gas pressurized to about 2 atm.

In embodiments such alloys are produced by a method that further comprises: subjecting the alloy to a hot isostatic pressing at 900° C. and about 100 MPa Ar for 2 hours; annealing the alloy so as to form a single-phase microstructure of β-phase; and cooling the alloy from the β-phase to an α-phase at a cooling rate so as to form α-phase laths in a basketweave morphology. The annealing can be at a temperature range of about a β-transus temperature of the alloy to about 950° C. The cooling rate can be between about 0.03° C. per second to about 10° C. per second.

The subject matter of the aforesaid examples of the described technology include additional forms and examples of the titanium alloy of the method and constituents described. Thus, the described alloys are found to exhibit a wide scope of technology. Examples include forms of the alloys and methods described enable creation of the alloys in various forms such as powders and wire useful for additive manufacturing. By way of example but not limitation, the following examples illustrate such technology and utility.

In embodiments such alloys and methods, suitably titanium alloys, comprise at least one of the physical properties described herein.

Example 1: Alloy QTTi-1A

A melt was prepared with the nominal composition of 4.5 Al, 3.0 V, 2.0 Cr, 1.5 Mo, 1.0 Sn, 0.40 Fe, 0.15 O, and balance Ti, in wt %. As described above, this example alloy includes a variance in the constituents in the range of plus or minus ten percent of the mean (nominal) value. The alloy was cast partially by remelting foundry scrap of Ti 6-4, with appropriate alloying additions. The foundry scrap constituted at least about 75% of the casting. The casting weighed about 13 kg and measured about 15 cm in height, about 15 cm in width, and about 15 cm in depth. The alloy was subjected to a hot isostatic pressing at 900° C. and about 100 MPa in an argon atmosphere for 2 hours, slowly cooled to room temperature, then solutionized at 950° C. for 1 hour, and quenched with pressurized gas to room temperature at an estimate cooling rate of about 1° C. per second to about 2° C. per second. The pressure of the gas was about 2 atm. $K_\alpha$ was calculated as $9.3\times10^{-20}$ $m^2\cdot mol/J\cdot s$. The tensile strength and $K_Q$ fracture toughness were measured for various tempering conditions, using two samples per each condition. A comparison of the measured properties of alloy A and cast Ti 6-4 is shown in the following Table 3.

Figure 8:
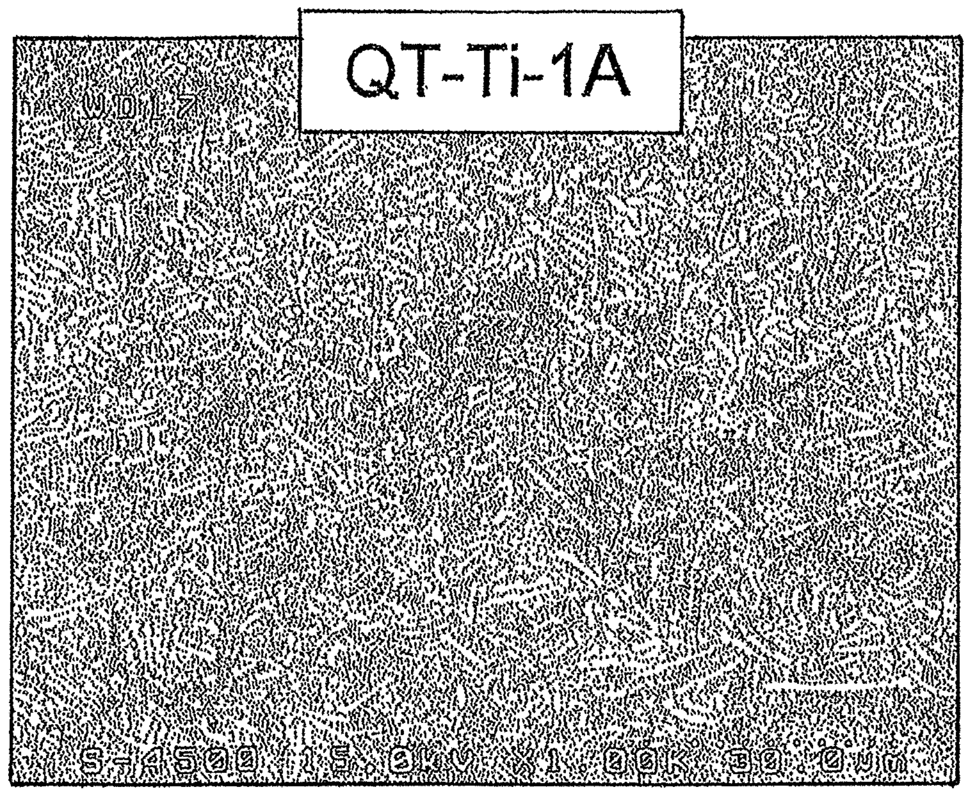
FIG. 8 is a scanning electron microscope image showing α-phase laths in a basketweave morphology for a non-limiting embodiment of alloys falling within the scope of the disclosure as described herein including, for example, FIG. 1.
Figure 9:
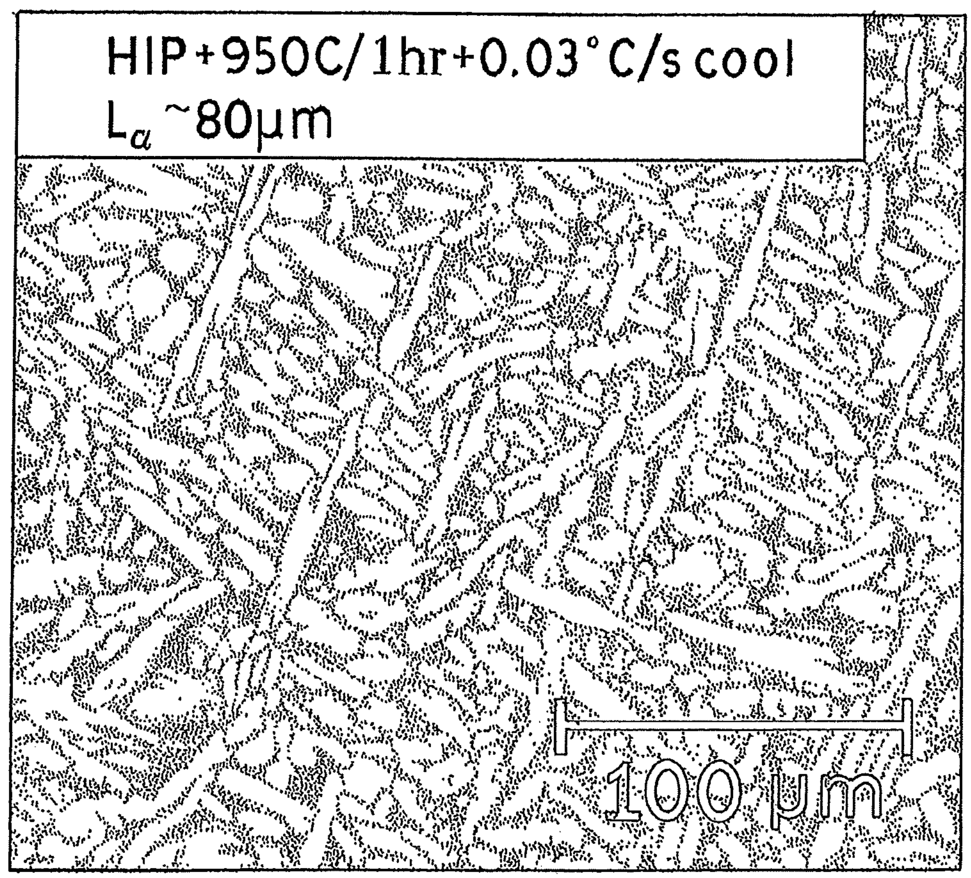
FIG. 9 is an optical micrograph similar to FIG. 8 showing α-phase laths in a basketweave morphology for a non-limiting embodiment that is cooled after annealing at 950° C. at a cooling rate of about 0.03° C. per second.
Figure 10:
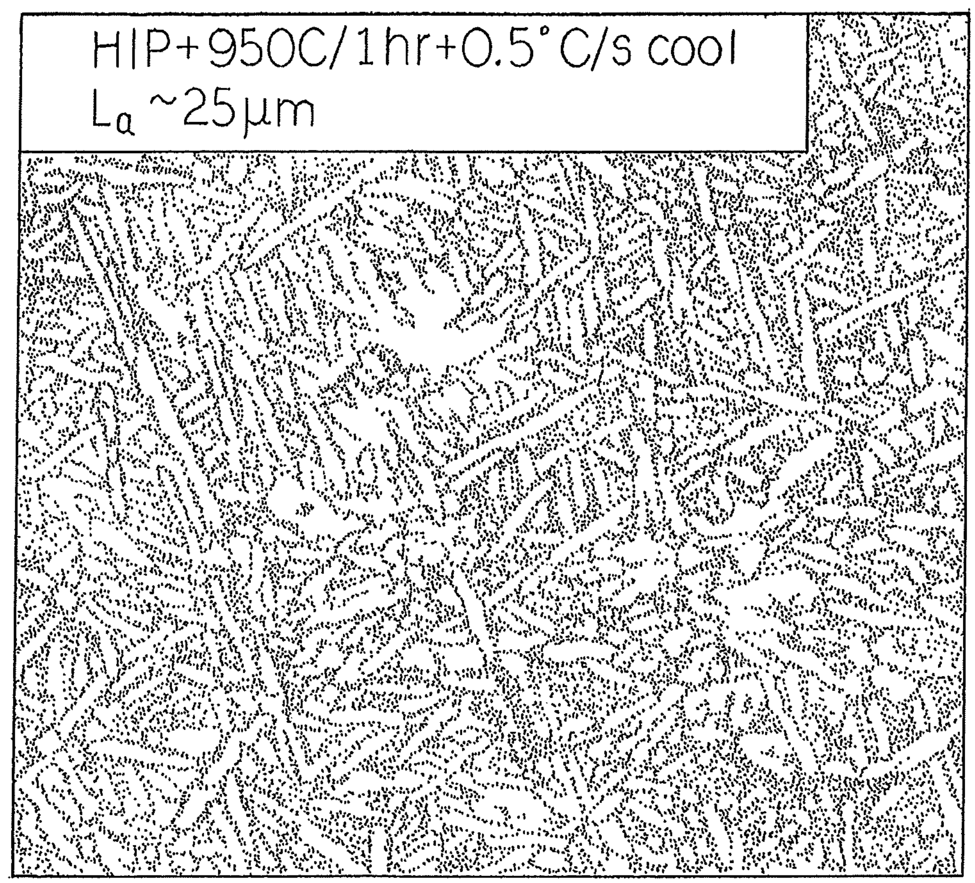
FIG. 10 is an optical micrograph similar to FIG. 9 showing α-phase laths in a basketweave morphology for a non-limiting embodiment that is cooled after annealing at 950° C. at a cooling rate of about 0.5° C. per second.
Figure 11:
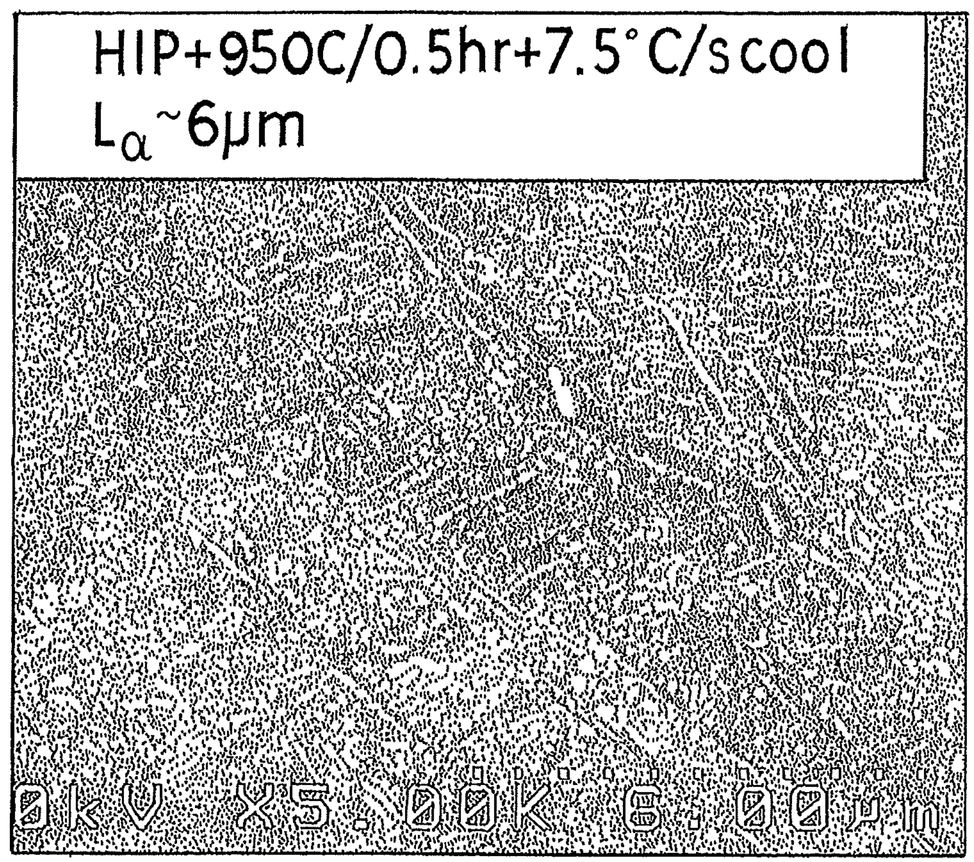
FIG. 11 is an optical micrograph similar to FIGS. 9 and 10 showing α-phase laths in a basketweave morphology for a non-limiting embodiment that is cooled after annealing at 950° C. at a cooling rate of about 7.5° C. per second.
Figure 12:
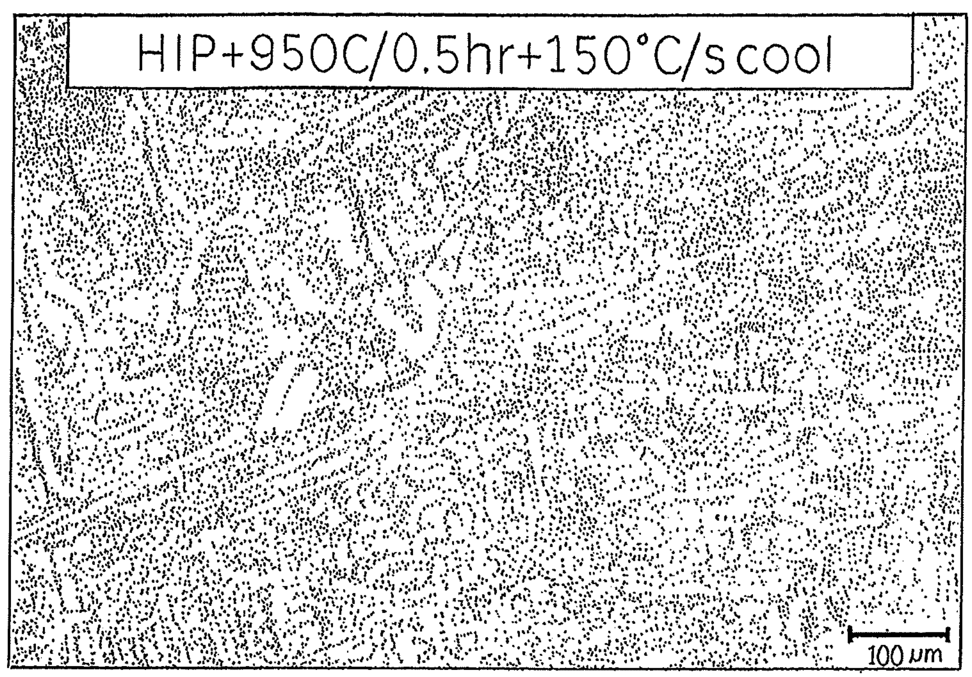
FIG. 12 is an optical micrograph showing α-phase plates with a high aspect ratio in a martensitic microstructure for a non-limiting embodiment that is cooled after annealing at 950° C. at a cooling rate of about 150° C. per second.

Referring also to FIG. 8, the QTTi-1A alloy forms α-phase laths in a basketweave morphology. Compared to the colonies of parallel a lamellae in Ti 6-4, the α-phase laths of the QTTi-1A alloy are about ten times smaller. FIGS. 9, 10, and 11 show QTTi-1A cooled after annealing at 950° C. at a cooling rate of about 0.03° C. per second, about 0.5° C. per second, and about 7.5° C. per second, respectively. A basketweave microstructure is seen at all of these cooling rates. La represents the longest dimension of the α laths. The α-phase laths are coarser in QTTi-A slow-cooled at about 0.03° C. per second than QTTi-1A gas-quenched at about 1° C. per second to about 2° C. per second. Thus, below a cooling rate of about 10° C. per second, a higher cooling rate can refine the basketweave microstructure further. Above a cooling rate of about 10° C. per second, however, the diffusional a transformation is largely suppressed, resulting in a displacive martensitic transformation that leaves a large amount of retained β phase. FIG. 12 shows α-phase plates with a high aspect ratio in a martensitic microstructure for QTTi-1A fast-quenched after annealing at 950° C. at a cooling rate of about 150° C. per second.

Figure 13:
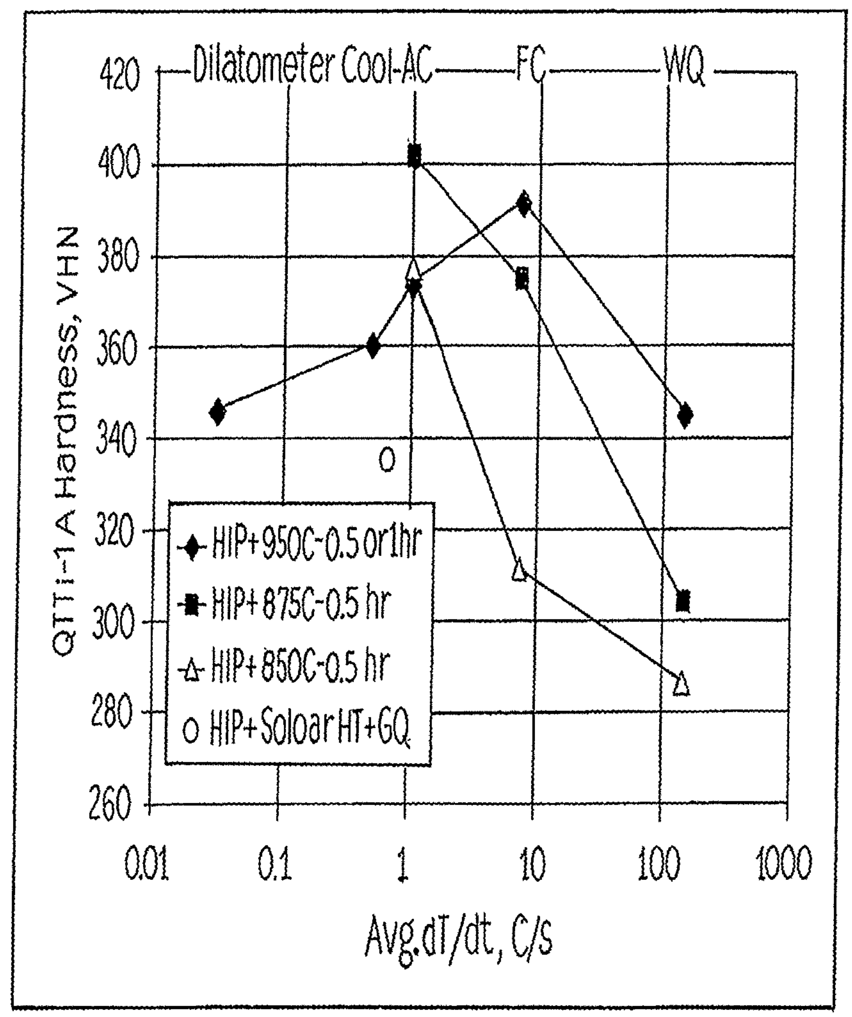
FIG. 13 is a graph plotting the Vickers hardness number at varying annealing temperatures against the cooling rate for a non-limiting embodiment of alloys falling within the scope of the disclosure as described herein including, for example, FIGS. 8-11.

FIG. 13 shows the hardness response of QTTi-1A under different annealing temperatures and cooling rates. The hardness data in diamonds show QTTi-1A annealed in a single-phase microstructure of β-phase at 950° C. The data is nonlinearly dependent to the cooling rate after annealing. At higher cooling rates above about 10° C. per second, the martensitic transformation leaves a large amount of retained β that reduces the hardness. Below a cooling rate of about 10° C. per second, however, the hardness is increasing with cooling rate due to the refinement of the basketweave microstructure. Compared to fast-quenched samples, the slow-cooled QTTi-1A shows a lower strength yet higher ductility. The combination of strength and ductility for the slow-cooled QTTi-1A, however, is still superior to that of the Ti 6-4 castings data reported in L. Nastac, M. N. Gungor, I. Ucok, K. L. Klug & and W. T. Tack, *Advances in Investment Casting of Ti-6Al-4 V Alloy: A Review,* 19 International Journal of Cast Metals Research 73 (2006) (see FIG. 15). The hardness data in squares and triangles show QTTi-1A annealed in a two-phase microstructure of α-phase and β-phase at 875° C. and 850° C., respectively. At these temperatures, the β matrix before cooling is enriched with β stabilizers due to formation of primary α. The enrichment of β stabilizers in turn suppresses the diffusive a formation at lower cooling rates. The peak hardness for QTTi-1A cooled from these temperatures is therefore shifted to a lower cooling rate, as indicated by the two hardness curves.

Example 2: Alloy QTTi-1B

In preparing alloy QTTi-1B as a counter-example, a melt was prepared with the nominal composition of 4.5 Al, 3.0 V, 2.0 Cr, 1.5 Mo, 1.0 Sn, 0.40 Fe, 0.15 O, 0.01 B, and balance Ti, in wt %. The only intended difference from alloy QTTi-1A was an alloying addition of boron. As described above, this alloy includes a variance in the constituents in the range of plus or minus ten percent of the mean (nominal) value. The alloy was cast partially by remelting foundry scrap of Ti 6-4, with appropriate alloying additions. The foundry scrap constituted at least about 75% of the casting. The casting weighed about 13 kg and measured about 15 cm in height, about 15 cm in width, and about 15 cm in depth. The alloy was subjected to a hot isostatic pressing at 900° C. and about 100 MPa in an argon atmosphere for 2 hours, slowly cooled to room temperature, then solutionized at 950° C. for 1 hour, and quenched with pressurized gas to room temperature. The pressure of the gas was about 2 atm. The tensile strength and $K_Q$ comparison of the measured properties of alloy QTTi-1B and cast Ti 6-4 is shown in Table 3. While boron can provide additional benefit to the growth restriction factor for casting, it rapidly increases the solidification range. Furthermore, it was found that boron has a low solubility in titanium and can form boride particles that can reduce the toughness and ductility of the alloy.

Example 3: Alloy QTTi-1C

In preparing alloy QTTi-1C as a counter-example, a melt was prepared with the nominal composition of 4.5 Al, 3.0 V, 2.0 Cr, 1.5 Mo, 1.0 Sn, 0.40 Fe, 0.15 O, 0.10 Y, and balance Ti, in wt %. The only intended difference from alloy QTTi-1A was an alloying addition of yttrium. The alloy was cast partially by remelting foundry scrap of Ti 6-4, with appropriate alloying additions. The foundry scrap constituted at least about 75% of the casting. The casting weighed about 13 kg and measured about 15 cm in height, about 15 cm in width, and about 15 cm in depth. The alloy was subjected to a hot isostatic pressing at 900° C. and about 100 MPa in an argon atmosphere for 2 hours, slowly cooled to room temperature, then solutionized at 950° C. for 1 hour, and quenched with gas to room temperature. The pressure of the argon gas was about 2 atm. The tensile strength and $K_Q$ comparison of the measured properties of alloy QTTi-1C and cast Ti 6-4 is shown in the following Table 3. Ytrrium is a strong oxide former, and as such it formed an excessive amount of yttria particles that were detrimental to toughness and ductility. As such yttrium, scandium, and rare earth elements are substantially avoided in alloys according to embodiments described herein.

TABLE 3

| | 0.2% Yield Stress (MPa) | Ultimate Tensile Stress (MPa) | Elongation (%) | Reduction of Area (%) | $K_Q$ (MPa$\sqrt{m}$) |
|---|---|---|---|---|---|
| QTTi-1A | 940 | 1040 | 11 | 16 | 95 |
| QTTi-1B | 920 | 1010 | 5 | 11 | 77 |
| QTTi-1C | 960 | 1050 | 4 | 3 | 36 |
| Cast Ti 6-4 | 770 | 870 | 8 | 15 | 76 |

As seen in Table 3, alloys according to embodiments disclosed herein, such as QTTi-1A, can achieve superior physical properties as compared to existing cast titanium alloys, including Ti 6-4, and can be manufactured and processed at a lower cost than such existing wrought titanium alloys. Additionally, the physical properties achieved by the alloys are relatively uniform throughout the alloy, even at higher levels of iron and oxygen.

Example 4: Alloys B72-B78

A series of seven model alloys were prepared to evaluate the effect of composition within the alloys according to embodiments disclosed herein. The compositions of the model alloys are listed in Table 2 above. Buttons of the model alloys, weighing about 20 grams each, were arc-melted in an inert argon atmosphere. The seven model alloys all have the same aluminum, vanadium, oxygen, and iron contents as the QTTi-1A alloy, with variations in the chromium, molybdenum, and tin contents. The β transus temperature, $K_\alpha$, and martensite start temperature are all similar for the seven model alloys. As a result, they all show a similar fine-scale, interlocking "basketweave" microstructure.

Figure 14:
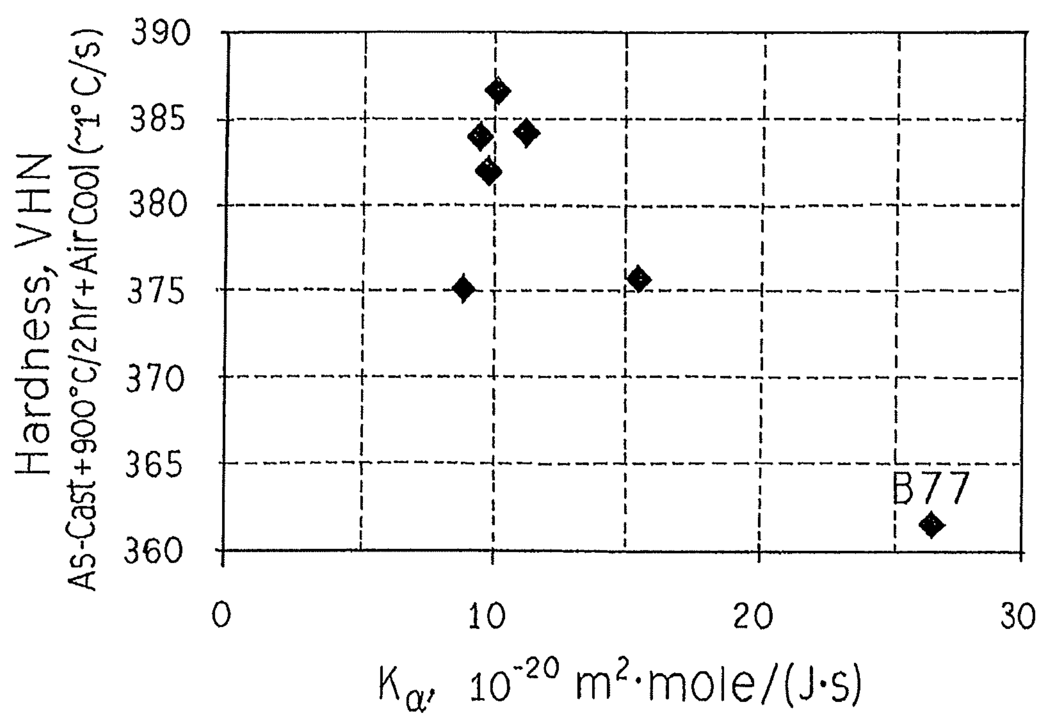
FIG. 14 is a graph plotting the Vickers hardness number against the coarsening-rate constant of the α phase for non-limiting embodiments of alloys within the scope of the disclosure as described herein including, for example, FIGS. 8-11.

FIG. 14 is a graph plotting the Vickers hardness number (VHN) against $K_\alpha$ for the seven model alloys. A variation in hardness is observed, from about 385 VHN to about 439 VHN. As shown in FIG. 14, this variation can be correlated with $K_\alpha$. The B77 model alloy is practically free of molybdenum and lacks hardness compared to the other model alloys. The microstructure of the B77 prototype shows a transition between the basketweave and lamellar morphology-some interlocking plates are observed, with parallel lamellar colonies in between. Referring also to FIG. 4, the B77 model alloy has a β-transus of about 865° C., yet a $K_\alpha$ greater than about $2\times10^{-19}$. As such, B77 or an alloy that contains no more than about 0.5% by weight of molybdenum is considered a counter-example.

Example 5: Alloy QTTi-2A

Figure 15:
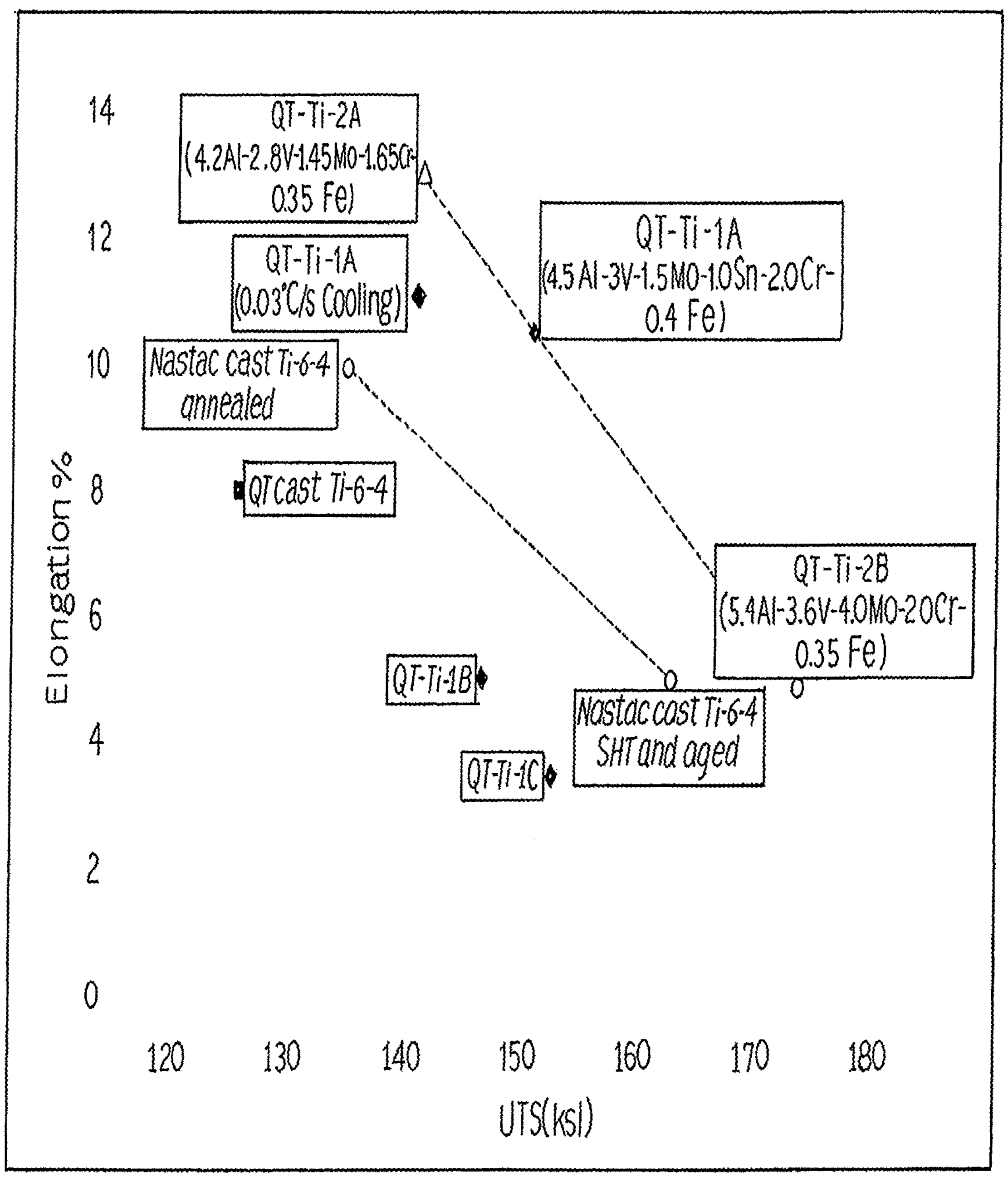
FIG. 15 is a graph plotting the strength and ductility of non-limiting embodiments of alloys falling within the scope of the disclosure as described herein including, for example, FIGS. 8-11.

A melt was prepared with the nominal composition of 4.3Al, 2.8V, 1.5Mo, 1.6Cr, 0.4Fe, 0.1Zr, 0.15O, and balance Ti, in wt %. By substantially eliminating the alloying addition of tin, the cost of the alloy is reduced. The measured composition listed in Table 2 further shows an incidental amount of zirconium in the alloy. The alloy was cast partially by remelting foundry scrap of Ti 6-4, with appropriate alloying additions. The foundry scrap constituted about 70% of the casting. The casting weighed about 13 kg and measured about 15 cm in height, about 15 cm in width, and about 15 cm in depth. The alloy was subjected to a hot isostatic pressing at 900° C. and about 100 MPa in an argon atmosphere for 2 hours, slowly cooled to room temperature, then solutionized at 950° C. for 1 hour, and quenched with gas to room temperature. The pressure of the gas was about 2 atm, resulting in a cooling rate of about 1° C. per second to about 2° C. per second. The tensile strength and elongation of alloy QTTi-2A are shown in FIG. 15. Relative to QTTi-1A, QTTi-2A shows a reduced strength and increased ductility at a given cooling rate. QTTi-2A shows a basketweave microstructure.

Example 6: Alloy QTTi-2B

A melt was prepared with the nominal composition of 5.7Al, 3.6V, 4Mo, 1.9Cr, 0.4Fe, 0.5Zr, 0.15O, and balance Ti, in wt %. The measured composition listed in Table 2 further shows an incidental amount of zirconium in the alloy. The alloy was cast partially by remelting foundry scrap of Ti 6-4, with appropriate alloying additions. The foundry scrap constituted at least about 75% of the casting. The casting weighed about 13 kg and measured about 15 cm in height, about 15 cm in width, and about 15 cm in depth. The alloy was subjected to a hot isostatic pressing at 900° C. and about 100 MPa in an argon atmosphere for 2 hours, slowly cooled to room temperature, then solutionized at 950° C. for 1 hour, and quenched with gas to room temperature. The pressure of the gas was about 2 atm, resulting in a cooling rate of about 1° C. per second to about 2° C. per second. The tensile strength and elongation of alloy QTTi-2B are shown in FIG. 15. Compared to QTTi-1A and QTTi-2A, QTTi-2B shows a higher strength and lower ductility. The microstructure shows a basketweave morphology, and the mechanical properties lie on the high-strength end of the strength-ductility band that includes QTTi-1A and QTi-2A.

Example 7: Alloy QTTi-1A and QTTi-2A

Figure 16:
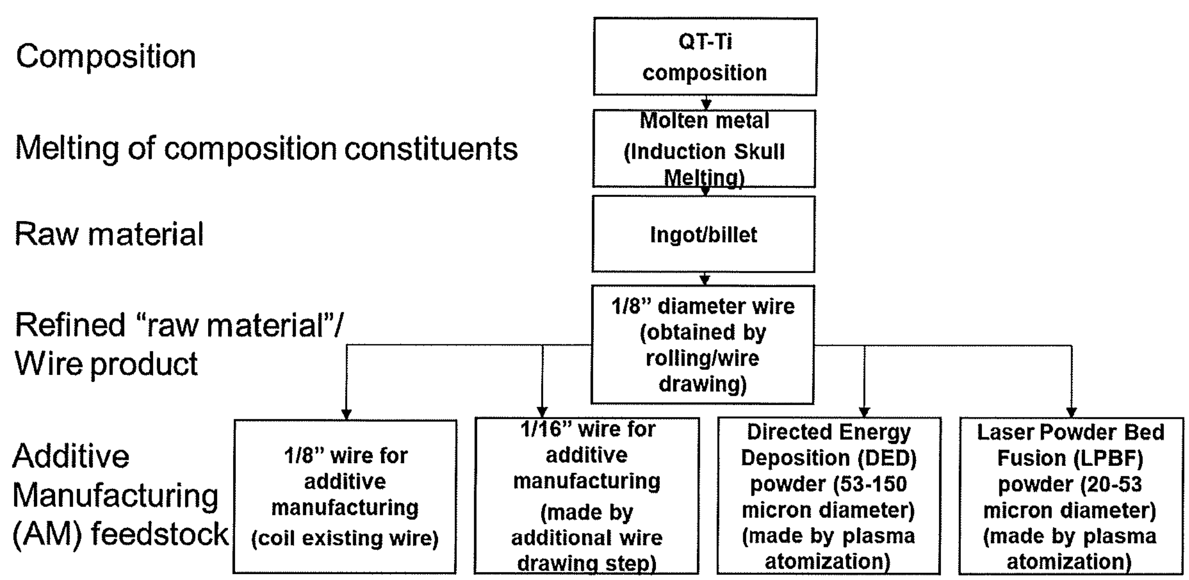
FIG. 16 is a summary flow chart illustrating the processing steps associated with the Alloy QTTi to create materials amenable for additive manufacturing.

Referring to FIG. 16, there is depicted methods of processing the alloys in the form of ingots (billets) as set forth in Examples for alloys QTTi-1A and QTTi-2A. These representative alloys were subjected to further post processing of the basic alloys to achieve various manufacturing goals.

Thus, the post processing provides a pathway to adapt the basic alloys in ingot form for use in additive manufacturing. More specifically, a protocol for adapting the basic alloys ("1A" and "2A") may be further processed for use to enable additive manufacturing techniques such as bonding of Ti components using laser technology techniques. As illustrated in FIG. 16 the alloy ingots may be converted into a wire form or powder form to enable additive manufacturing while maintaining the synergy of the alloy materials which are bonded or otherwise utilized using additive manufacturing techniques.

Briefly, referring to FIG. 16, Alloy 1A, as a first step, ingots of the starting form of the alloy are converted into wire by rolling or drawing techniques. The wire form may be generated in a desired diameter as indicated and may be used by processes such as directed energy or plasma based wire deposition.

Test Samples "1A-powder". This technology utilizes Direct Metal Laser Sintering and subsequent post processing, which may include Hot Isostatic Pressing and heat treatment to obtain an equiaxed-grained microstructure in QT-Ti-1A, with grain sizes up to an order of magnitude smaller than its cast, HIP, and heat treated equivalent.

Titanium Alloy "1A" was processed using induction skull melting (ISM), wire drawing, and plasma atomization to obtain spherical powder in the size range of 20-53 microns. The ISM process uses induction to stir the molten metal which results in a homogeneous casting. A water cooled copper crucible is housed inside a vacuum chamber. This process is particularly useful for alloys like titanium, which have a tendency to be reactive. This process may also use various input materials to make up the melt. Converting the material into wire may take place in several steps, including forming the material into the appropriate size to input into the conversion, rolling, and wire drawing steps to obtain clean, dimensionally accurate wire suitable for additional processes, including wire-based additive manufacturing. During the plasma atomization process, wire is fed into the path of multiple plasma torches, where the molten metal is subject to the associated kinetic energy at the apex and atomized. An inert gas such as argon may be used to mitigate reactivity with oxygen during this process. As a result of the high velocity of the plasmas, fine spherical powders suitable for additive manufacturing may be produced. The chemical composition of the as-atomized powder is as follows in wt %:

| Element | 20-53 micron powder bulk chemistry |
|---|---|
| C | 0.014 |
| N | 0.006 |
| O | 0.158 |
| S | — |
| H | 0.0033 |
| Fe | 0.34 |
| Al | 4.55 |
| V | 2.94 |
| Mo | 1.49 |
| Cr | 1.99 |
| Sn | 1.11 |
| Zr | <0.002 |
| Y | 0.002 |
| Other | <0.10 |
| Ti | BAL |

In one embodiment of the material, powder was deposited using the Direct Metal Laser Sintering (DMLS) process on an EOS M280 machine to produce crack-free test samples. Example bulk laser parameters include a Laser power: 370 W; Scan speed: 1250 mm/s; Scan spacing: 0.162 mm.

The chemistry of the test sample after deposition by DMLS using the above laser parameters was found to be as follows in wt %:

| Element | Bulk parameters (370 W, 1250 mm/s, 0.162 mm) |
|---|---|
| C | 0.0120 |
| N | 0.0340 |
| O | 0.22 |
| S | <0.0005 |
| Fe | 0.38 |
| Al | 4.40 |
| V | 2.87 |
| Mo | 1.48 |
| Cr | 1.91 |
| Sn | 1.00 |
| Zr | <0.02 |
| Y | <0.02 |
| Ti | BAL |

Following deposition into geometric blank sizes conducive to tensile testing (e.g. 0.6"×0.6"×3.5" rectangles), these samples were HIP treated as per the procedure prescribed earlier in this document. Furthermore, some of the samples were subsequently annealed at 950° C./1 hr with a controlled cooling rate as prescribed earlier in this document. For example, in some embodiments the cooling rate may be in the range of about 0.03° C. per second to about 10° C. per second.

Figure 16A:
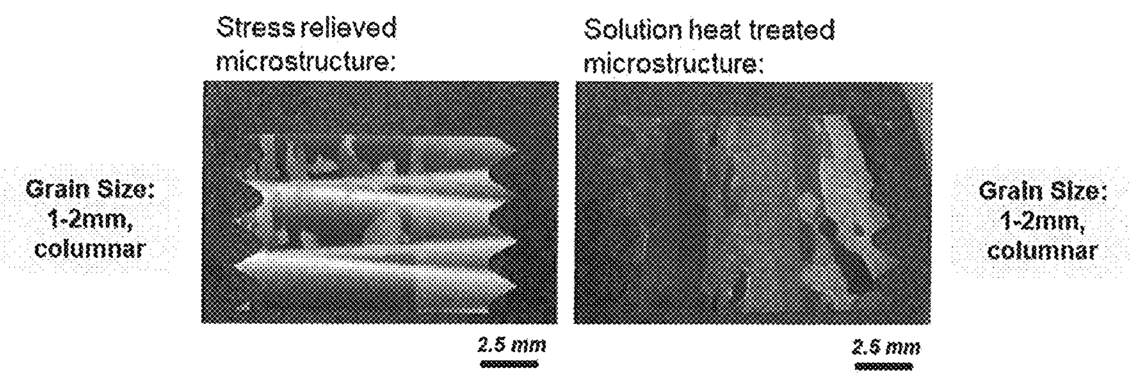
FIG. 16A is a micro photograph of the microstructure of the additively manufactured material which was fabricated using wire-based additive techniques.
Figure 16B:
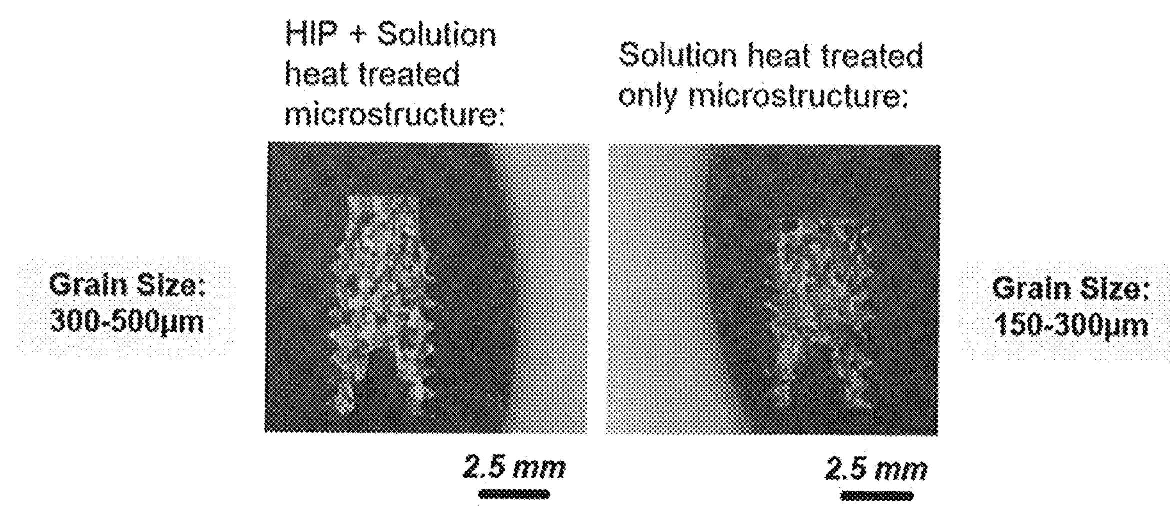
FIG. 16B is a micro photograph of embodiments of the microstructure of the additively manufactured material referenced in FIG. 16, which was fabricated using Direct Metal Laser Sintering (DMLS) and powder.

The microstructure, upon evaluation of the samples, was found to be comprised of equiaxed grains, with prior beta grain boundaries made visible through standard metallographic techniques and etching with Kroll's reagent. The grain sizes were estimated as shown in FIG. 16B. As observed, grains are slightly larger if a HIP treatment is included in the complete process, and slightly smaller if a HIP treatment is not utilized. These grain sizes are approximately an order of magnitude smaller than what is typically obtained in this alloy for a cast and heat treated microstructure, where grains are typically found to be on the order of 1-2 mm in size. Furthermore, grains are equiaxed rather than columnar as is typically observed in additively manufactured Ti-6Al-4V, and additionally observed in wire-AM of QT-Ti-1A, FIG. 16A.

Tensile strength was measured, and the yield strength ranged from about 146 ksi to 155 ksi, and the ultimate tensile strength (UTS) ranged from about 165 ksi to 173 ksi. Elongation ranged from about 8 to 14%. Reduction in area ranged from about 10 to 29%. Range in properties may be attributed to differences in post-processing.

Test Samples "1A-wire". In another embodiment of QT-Ti-1A, the 1/16" diameter wire form may be directly used to fabricate articles using wire-based additive manufacturing technologies. After using a wire based technique which utilizes plasma to deposit the material, crack free material was formed.

After heat treating crack free materials fabricated via wire-based additive manufacturing at 950° C. for 1 hour, followed by cooling in the range of about 0.03° C. per second to about 10° C. per second, tensile properties were measured. Yield strength ranged from about 124 ksi to 130 ksi, ultimate tensile strength ranged from about 144 ksi to 151 ksi, elongation ranged from about 14% to 24%, and reduction in area ranged from about 27% to 59%, depending on orientation and processing factors.

Test Samples "2A-wire". In certain embodiments of the alloys, wire of the QTTi-2A composition may be fabricated into testable articles using an electron beam based additive manufacturing technique. This technology may be used to fabricate articles at a fast deposition rate (5 to 15 lbs per hour) and at relatively large size scales (up to 245" by 62"×55").

The QTTi-2A composition was produced in ingot form by vacuum casting and rolled/wire drawn to 1/8" diameter wire appropriate for additive manufacturing using an electron beam to deposit material. Crack-free additively manufactured articles may be obtained and heat treated as per the specifications outlined earlier in this document. After processing in accordance with these procedures, mechanical properties were measured. Yield strength ranged from about 107 ksi to 122 ksi, ultimate tensile strength ranged from about 129 ksi to 138 ksi, elongation ranged from about 9% to 20%, and reduction in area ranged from about 22% to 76%, depending on orientation and processing factors.

It is understood that the disclosure may embody other specific forms without departing from the spirit or central characteristics thereof. The disclosure of aspects and embodiments, therefore, are to be considered in all respects as illustrative and not restrictive, and the claims are not to be limited to the details given herein. Accordingly, while specific embodiments have been illustrated and described, numerous modifications come to mind without significantly departing from the spirit of the invention and the scope of protection is only limited by the scope of the accompanying claims. Unless noted otherwise, all percentages listed herein are weight percentages.

What is claimed is:

1. A method for manufacture of a titanium alloy article of manufacture in the form of a wire or a powder for use in additive manufacture comprising the steps of:

(a) forming a melt having a Scheil freezing range less than about 200° C., and a β-phase transus temperature in a range below 900° C., said melt comprising, by weight, about 4.0% to about 5.5% aluminum (Al), 0% to about 1.0% tin (Sn), about 2.5% to about 3.5% vanadium (V), about 1.0% to about 2.0% molybdenum (Mo), about 1.0% to about 2.0% chromium (Cr), no more than about 0.35% oxygen (O), no more than about 0.55% iron (Fe), no more than about 0.2% other incidental elements and impurities, and the balance of weight percent comprising titanium (Ti);

(b) casting from said melt a cast alloy casting having said β phase transus temperature;

(c) optionally forming a wire from an ingot of the cast alloy casting and optionally forming a powder from said wire, for applications including but not limited to additive manufacturing;

(d) annealing said as cast alloy casting above the β phase transus temperature to form an annealed cast alloy casting characterized as having a single phase microstructure of β-phase with a body centered cubic crystal structure; and (e) cooling said annealed cast alloy casting from the β-phase at a cooling rate between 0.03° C. per second to 10° C. per second from at or above the β transus temperature to form, by nucleation and growth, fine α-phase laths with a basketweave morphology in the β-phase and to limit the formation of detrimental grain boundary α-phase lamellae.

2. The method of claim 1, wherein said melt is comprised of starting material combined in said melt of at least 25% of a titanium based alloy that includes, by weight, about 6% aluminum and about 4% vanadium, the balance of weight percent comprising titanium, the said starting material further including, by weight, 0% to about 0.35% oxygen, 0% to about 0.55% iron, and other incidental elements and impurities.

3. The method of claim 1 further including the step of subjecting the cast alloy casting of step (b) to hot isostatic pressing prior to step (d).

4. The method of claim 1, wherein step (e) includes cooling the as cast alloy casting step (e) with gas.

5. The method of claim 1 wherein the β transus temperature of step (a) is 825° C. to 900° C.

6. The method of claim 1 wherein the melt of step (a) has a normalized coarsening rate constant (Kα) less than below about $4\times10^{19}$ $m^2\cdot mol/J\cdot s$.

7. The method of claim 1 wherein the melt has a coarsening rate constant (Kα), said constant (Kα) located at approximately a nose temperature of a C-curve of a time-temperature transformation diagram of said melt.

8. The method of claim 1 wherein the laths are no more than about 100 microns.

9. A method for casting a titanium alloy article of manufacture comprising steps of:

(a) forming a melt having a Scheil freezing range less than about 200° C., and a β-phase transus temperature in a range below 900° C., said melt consisting essentially of, by weight, 3.0% to 5.6% aluminum (Al), 3.6% vanadium (V), 4.0% molybdenum (Mo), 1.9% chromium (Cr), 0.15% oxygen (O), 0.38% iron (Fe), 0.51% zirconium (Zr), no more than 0.2% other incidental elements and impurities, and the balance of weight percent comprising titanium (Ti);

(b) casting from said melt a cast alloy casting having said β phase transus temperature;

(c) optionally forming a wire from an ingot of the cast alloy casting and optionally forming a powder from said wire for applications including but not limited to additive manufacturing;

(d) optionally subjecting the cast alloy casting of step (b) to hot isostatic pressing prior to step (e);

(e) annealing said as cast alloy casting above the β phase transus temperature to form an annealed cast alloy casting characterized as having a single phase microstructure of β-phase with a body centered cubic crystal structure;

(f) cooling said annealed cast alloy casting from the β-phase at a cooling rate between 0.03° C. per second to 10° C. per second from at or above the β transus temperature to form, by nucleation and growth, fine α-phase laths with a basketweave morphology in the β-phase and to limit the formation of detrimental grain boundary α-phase lamellae.

10. The method of claim 1 wherein in step (c) the forming a powder from said wire comprises plasma atomization of said wire.

11. The method of claim 9 wherein in step (c) the forming a powder from said wire comprises plasma atomization of said wire.

* * * * *